United States Patent
Yoshida et al.

(10) Patent No.: US 8,018,713 B2
(45) Date of Patent: Sep. 13, 2011

(54) SOLID ELECTROLYTIC CAPACITOR HAVING DUAL CATHODE PLATES SURROUNDED BY AN ANODE BODY AND A PLURALITY OF THROUGH HOLES

(75) Inventors: Yuji Yoshida, Sendai (JP); Katsuhiro Yoshida, Sendai (JP); Takeo Kasuga, Sendai (JP); Masanori Takahashi, Sendai (JP); Takeshi Saito, Sendai (JP); Koji Sakata, Sendai (JP)

(73) Assignee: NEC Tokin Corporation, Sendai-Shi (JP)

( * ) Notice: Subject to any disclaimer, the term of this patent is extended or adjusted under 35 U.S.C. 154(b) by 720 days.

(21) Appl. No.: 12/148,250

(22) Filed: Apr. 17, 2008

(65) Prior Publication Data

US 2008/0259526 A1    Oct. 23, 2008

(30) Foreign Application Priority Data

Apr. 19, 2007   (JP) ................. 2007-110317

(51) Int. Cl.
*H01G 9/00* (2006.01)
*H01G 9/042* (2006.01)
*H01G 9/045* (2006.01)

(52) U.S. Cl. ........ 361/523; 361/528; 361/529; 361/531; 361/532; 361/540; 361/533

(58) Field of Classification Search ........... 361/523–540
See application file for complete search history.

(56) References Cited

U.S. PATENT DOCUMENTS

| | | | |
|---|---|---|---|
| 6,392,869 B2* | 5/2002 | Shiraishi et al. | 361/523 |
| 6,852,137 B2* | 2/2005 | Miki et al. | 29/25.03 |
| 6,917,514 B2* | 7/2005 | Mido et al. | 361/533 |
| 2006/0256507 A1* | 11/2006 | Yoshida et al. | 361/540 |
| 2007/0230093 A1* | 10/2007 | Kobayashi | 361/540 |

FOREIGN PATENT DOCUMENTS

| | | |
|---|---|---|
| JP | 2001-307956 A | 11/2001 |
| JP | 2002-237431 A | 8/2002 |

* cited by examiner

*Primary Examiner* — Jayprakash N Gandhi
*Assistant Examiner* — Arun Ramaswamy
(74) *Attorney, Agent, or Firm* — Holtz, Holtz, Goodman & Chick, PC

(57) ABSTRACT

Anodized films are formed at both surfaces of an aluminum base and, at the center portion on each side of the aluminum base, a solid electrolyte layer of a conductive polymer, a graphite layer, and a metal layer are stacked in the order, thereby forming a rectangular cathode portion. An insulator layer is formed at the peripheries of four sides of the cathode portion and, further, an anode lead frame is provided at the peripheries of four sides of the upper insulator layer, thereby forming an anode portion. Openings are formed at four corners of the insulator layer or the anode portion, thereby establishing electrical connection between the cathode portions on both sides of the aluminum base. By setting the ratio of a total region, occupied by the openings, of the cathode portion to 25% or less, the ESL of a capacitor can be suppressed low even when the openings are provided.

19 Claims, 13 Drawing Sheets

SOLID ELECTROLYTIC CAPACITOR HAVING DUAL CATHODE PLATES SURROUNDED BY AN ANODE BODY AND A PLURALITY OF THROUGH HOLES

This application is based upon and claims the benefit of priority from Japanese patent application No. 2007-110317, filed on Apr. 19, 2007, the disclosure of which is incorporated herein in its entirety by reference.

BACKGROUND OF THE INVENTION

This invention relates to a solid electrolytic capacitor using a flat plate-shaped valve action metal and, in particular, relates to a solid electrolytic capacitor with a large capacitance and a low ESL (Equivalent Series Inductance), using a conductive polymer as an electrolyte.

In recent years, reduction in size and increase in functionality of digital devices have been advanced. Accordingly, power supplies to be connected to the devices have also been required for adaptation to driving at high frequencies. Following it, noise countermeasures and smoothing of power supply voltages have become necessary. Thus, the roles of electrolytic capacitors in electronic circuits have been getting important. In these circumstances, there has been an increasing demand for solid electrolytic capacitors that are small in size, large in capacitance, and low in impedance regardless of the frequency range.

Generally, the impedance of a capacitor is determined by an ESR (Equivalent Series Resistance) in a frequency range lower than a self-resonant point, while, is largely affected by an ESL in a higher frequency range. In the case of a solid electrolytic capacitor, using as an anode a valve action metal such as aluminum, tantalum, niobium, titanium, or magnesium and using a solid conductive polymer as an electrolyte, it is possible to realize a low ESR equivalent to that of a multilayer ceramic capacitor. This is the characteristics obtained by the fact that the resistivity of the conductive polymer serving as the electrolyte is about $1/10$ to $1/100$ as compared with those of other kinds of solid electrolytes, such as manganese dioxide, and driving electrolyte solutions.

An aluminum solid electrolytic capacitor having a flat-plate element structure, which is one example of a solid electrolytic capacitor using a conductive polymer as an electrolyte, is formed, for example, in the following manner. At first, a dielectric film being an insulating film is formed by anodic oxidation at the surface of an aluminum base in the form of a flat plate-shaped porous aluminum metal serving as a valve action metal. Then, an insulator of an epoxy resin or the like is formed at a predetermined position on the dielectric film so as to divide the aluminum base into two regions and a solid electrolyte layer of a conductive polymer is formed in only one of the regions. Further, a graphite layer is formed on the solid electrolyte layer by screen printing or the like and a metal layer of a conductive paste is further formed on the graphite layer. In this manner, a cathode portion is formed. On the other hand, in the other region defined by the insulator, the aluminum base is exposed by stripping the dielectric film. In this manner, an anode portion is formed. The cathode portion and the anode portion are electrically connected to a cathode lead frame and an anode lead frame by bonding with a conductive adhesive and welding, respectively. In this manner, an external cathode terminal and an external anode terminal of a solid electrolytic capacitor are formed, respectively.

In the solid electrolytic capacitor using the conductive polymer as the electrolyte, since the ESR is low, the impedance in the low frequency range is sufficiently low. However, in order to apply this capacitor to a high-frequency driven circuit, it is necessary to simultaneously reduce the impedance also in the high frequency range. However, in the solid electrolytic capacitor, there has been a problem that the leading lengths of electrode wiring circuits inside the capacitor become long due to the internal structure of the element, which causes an increase in ESL so that the impedance in the high frequency range increases accordingly.

As a measure for solving this problem, there has been proposed a multi-terminal capacitor having a plurality of external electrodes. The multi-terminal capacitor is effective for reducing the ESL regardless of the type of capacitor. An electrode substrate is provided in which a plurality of external anode terminals and external cathode terminals are embedded as electrical contacts between anode and cathode portions of a capacitor and the exterior. Then, the anode and cathode portions of the capacitor are electrically connected to the external electrode terminals on the electrode substrate, thereby forming connection terminals to the exterior, respectively. With this structure, it is possible to provide an increased number of current loops formed between the external anode terminals and the external cathode terminals and thus to achieve a reduction in ESL in the high frequency range.

As a multi-terminal solid electrolytic capacitor using a conductive polymer as an electrolyte, there is an example disclosed in Japanese Unexamined Patent Application Publication (JP-A) No. 2002-237431 (Patent Document 1). The structure of the capacitor disclosed in Patent Document 1 will be described with reference to FIGS. 1A and 1B. FIG. 1A is a perspective view of the solid electrolytic capacitor disclosed in Patent Document 1 and FIG. 1B is a longitudinal sectional view taken along line A-A in FIG. 1A. In FIGS. 1A and 1B, a solid electrolytic capacitor 21 is configured such that cathode portions are formed on both sides of an anode body 22 in the form of a flat plate-shaped base made of a valve action metal and a plurality of through holes are formed in the thickness direction to thereby lead anode terminals, connected to the anode body 22, to the surfaces of the cathode portions. On each side of the anode body 22, an anodized film 23, a solid electrolyte layer 25, and a cathode layer 26 are formed in this order and a capacitor structure is formed between the anode body 22 and the cathode layer 26. The through holes are formed in a lattice point pattern in the solid electrolytic capacitor 21 and regions of the anode terminals are provided in the lattice point pattern on the surface of each cathode layer 26 where a region serving as a cathode is spread over.

An anode lead portion 27 is formed in each through hole by press-fitting a valve action metal therein. Each anode lead portion 27 is in contact with the anodized film 23 being an insulator and is further in contact with the solid electrolyte layer 25 and the cathode layer 26 through an insulator layer 24. In the multi-terminal solid electrolytic capacitor disclosed in Patent Document 1, although there is no particular description about an electrode substrate, it is considered possible, when forming the capacitor into a product, to use an electrode substrate provided therein with a plurality of external anode terminals and external cathode terminals by disposing it on the upper or lower surface of the capacitor and connecting its external anode and cathode terminals to the anode lead portions 27 and the cathode layer 26, respectively, using a conductive adhesive or the like. Further, insulation by coating or casing is necessary on the side surfaces and the bottom surface of the capacitor and, further, it is also necessary to provide some structure for electrical connection between the cathode layers 26 on the upper and lower sides.

This solid electrolytic capacitor is fabricated in the following manner. At first, there is prepared a flat plate-shaped anode body 22 made of a porous valve action metal such as aluminum, tantalum, or niobium. Then, a plurality of through holes are formed in the anode body 22 in a direction perpendicular to the flat surfaces thereof by etching or machining. Then, an anode lead portion 27 made of a valve action metal of the same kind as that of the anode body 22 is embedded in each of the through holes by press-fitting. Then, the anode body 22 is anodized to form an anodized film 23 at each of the main surfaces thereof. Thereafter, on each anodized film 23, an insulator layer 24 is formed around each of the projecting anode lead portions 27 by the use of a photoresist or the like. Subsequently, a solid electrolyte layer 25 of a conductive polymer is formed on each anodized film 23 by chemical oxidation polymerization and then a cathode layer 26 composed of a graphite layer and a silver layer is formed thereon. Accordingly, the solid electrolytic capacitor 21 is configured such that the entire surface of the cathode layer 26 is exposed on each side of the capacitor 21 and the anode lead portions 27 each surrounded by the insulator layer 24 lie scattered side by side like islands in the surface of the cathode layer 26. According to this structure, by forming external electrode terminals into a multi-terminal structure, it is possible to obtain a solid electrolytic capacitor with shortened lengths of electrode wiring circuits and with a plurality of current loops. This makes it possible to realize a reduction in ESL and achieve an improvement in high frequency characteristics.

As an ESL reducing approach different from the multi-terminal capacitor with the plurality of external electrode terminals disclosed in Patent Document 1, a method has been examined that devises the shapes of an anode portion and a cathode portion. This method provides a structure in which, in leading paths of wiring circuits up to external electrode terminals in a capacitor, a region where an anode portion and a cathode portion face each other with an insulator interposed therebetween is provided as long as possible, thereby allowing current loops to be formed between the anode portion and the cathode portion facing each other. This corresponds to the case where a plurality of inductors are connected in parallel with each other between an anode and a cathode, thus leading to the effect of reducing the ESL of the capacitor on the whole. Since the external shape of a solid electrolytic capacitor is generally a flat-plate square shape, the shape of a cathode portion is advantageously rectangular for increasing the capacitance. In order to provide as long as possible a region where an anode portion and a cathode portion face each other with an insulator interposed therebetween when the shape of the cathode portion is rectangular, there has been proposed a double surrounding structure in which the insulator is formed so as to surround the peripheries of four sides of the cathode portion and further the anode portion is formed so as to surround the peripheries of four sides of the insulator.

As a solid electrolytic capacitor using a conductive polymer as an electrolyte and having the double surrounding structure as described above, there is an example disclosed in Japanese Unexamined Patent Application Publication (JP-A) No. 2001-307956 (Patent Document 2). The structure of this capacitor will be described with reference to FIGS. 2A and 2B. FIG. 2A is a perspective view of the solid electrolytic capacitor disclosed in Patent Document 2 and FIG. 2B is a longitudinal sectional view taken along line A-A in FIG. 2A. In FIGS. 2A and 2B, a solid electrolytic capacitor 21 is configured such that a cathode portion is formed on the upper surface of an anode body 22 in the form of a rectangular, particularly square, flat plate-shaped base made of a valve action metal and a bottom anode lead portion 28 formed on the lower surface of the anode body 22 is drawn out from its side portions to the upper surface of the capacitor. On the upper surface of the anode body 22, an anodized film 23 is first formed and then a solid electrolyte layer 25 and a cathode layer 26 serving as the cathode portion are formed in this order. With this structure, a capacitor structure is formed between the anode body 22 and the cathode layer 26.

On the outer side of the solid electrolyte layer 25 and the cathode layer 26 serving as the cathode portion, an anode lead portion 27 is formed with an insulator layer 24 interposed therebetween. Since the bottom anode lead portion 28 is connected to the anode lead portion 27, the anode lead portion 27 is electrically connected to the anode body 22 through the bottom anode lead portion 28. The anode lead portion 27 is configured to surround the peripheries of four sides of the cathode portion through the insulator layer 24 so that there is formed a region where the anode portion and the cathode portion face each other with the insulator layer 24 interposed therebetween. Further, a protective layer 29 is formed on the side surfaces and the bottom surface of this capacitor element.

This solid electrolytic capacitor is fabricated in the following manner. At first, a sheet-like square anode body 22 made of a porous valve action metal such as aluminum or tantalum is subjected to anodic oxidation. In this manner, an anodized film 23 is formed at one surface (upper surface in the figure) thereof. Thereafter, a solid electrolyte layer 25 of a conductive polymer or manganese dioxide is formed and then a cathode layer 26 is formed on the surface thereof. Then, a bottom anode lead portion 28 greater in width than the anode body 22 is formed on the lower surface of the anode body 22 by a method such as metal deposition or sputtering or bonding of a metal layer. Then, an insulator layer 24 of an epoxy resin is formed so as to surround the side surfaces of the anode body 22, the anodized film 23, the solid electrolyte layer 25, and the cathode layer 26. Further, a metal layer of gold, copper, nickel, or the like is formed on the outer side of the insulator layer 24 by a method such as deposition or sputtering, thereby obtaining an anode lead portion 27. Finally, a protective layer 29 is formed on the side surfaces and the bottom surface of this capacitor element. The upper surfaces of the cathode layer 26, the insulator layer 24, the anode lead portion 27, and the protective layer 29 are configured to be flush with each other.

In this manner, as described above, in the solid electrolytic capacitor 21, the anode lead portion serving as the electrode drawn out from the inner anode body is formed so as to surround the peripheries of four sides of the square cathode portion with the insulator layer interposed therebetween. Therefore, it is possible to configure that the cathode portion and the anode lead portion face each other in this region. According to this structure, current loops can be generated between the anode portion (anode lead portion) and the cathode portion facing each other. Thus, it is possible to realize a reduction in ESL of the solid electrolytic capacitor.

SUMMARY OF THE INVENTION

It is considered that if the foregoing techniques about the solid electrolytic capacitors respectively disclosed in Patent Document 1 and Patent Document 2 can be used in combination with each other, it is possible to realize a further reduction in ESL of a solid electrolytic capacitor. However, these two techniques cannot be simply combined together for the following reasons and an approach is necessary for solving these technical subjects.

The first subject is electrical connection to the lower-side cathode layer in the solid electrolytic capacitor disclosed in Patent Document 1. As shown in FIGS. 1A and 1B, in the solid electrolytic capacitor disclosed in Patent Document 1, the cathode layers are formed on both upper and lower sides so as to sandwich therebetween the anode body located in the middle. Since these two cathode layers are not electrically connected to each other, when external electrode terminals are concentratedly arranged on one side, it is necessary to separately provide, outside the solid electrolytic capacitor, means for establishing electrical connection between the cathode layers on both sides. However, when combining with the technique disclosed in Patent Document 2, it is necessary to provide the anode portion so as to surround the peripheries of four sides of the rectangular cathode portion with the insulator interposed therebetween in the solid electrolytic capacitor. Since the means for establishing electrical connection between the cathode layers on both sides, itself, is regarded as a part of the cathode portion, it is necessary that this connection means be configured to be provided on the inner side of the anode portion so as to be surrounded by the anode portion along with the cathode layers on both sides.

The second subject is the presence of the plurality of through holes formed in the thickness direction in Patent Document 1. In Patent Document 1, it is configured that the plurality of through holes are arranged in the lattice point pattern and the inner side of each through hole is used as the electrode terminal of the anode portion while the outer side thereof is used as the electrode terminal of the cathode portion, thereby shortening the wiring distances. However, in this case, it is necessary to provide the through holes in the cathode portions on both sides as many as the number of external anode terminals formed at an electrode surface of the solid electrolytic capacitor and the area of the cathode portions is reduced corresponding to the regions on the inner side of the through holes. Since the reduction in area of the cathode portions directly leads to a reduction in capacitance of the solid electrolytic capacitor, it is necessary to optimize the positions and area of the through holes so as to minimize the reduction in area of the cathode portions.

It is therefore an object of this invention to propose a structure that can minimize a reduction in area of cathode portions in a multi-terminal solid electrolytic capacitor in which an anode portion is formed so as to surround the peripheries of four sides of the rectangular cathode portion with an insulator layer interposed therebetween and a plurality of external anode terminals and external cathode terminals are provided in the same plane. With this structure, it is possible to realize a reduction in ESL in a high frequency range of a solid electrolytic capacitor using a conductive polymer as an electrolyte without reducing the capacitance.

In the case of fabricating a solid electrolytic capacitor by forming anodized films at both upper and lower surfaces of an anode body and further forming a solid electrolyte layer and a cathode layer in this order on each of the anodized films, the polarities of the respective layers formed in the capacitor are in order of cathode-anode-cathode from the upper side. Therefore, for example, in order to concentrate electrode terminals at one surface of the capacitor on the upper side, it is necessary to provide some electrical connection means inside the capacitor so as to establish electrical connection from the inner anode body and the lower-side cathode layer to the upper-side electrode terminals, respectively. For the electrical connection from the anode body located substantially in the middle in the thickness direction of the capacitor, following the conventional technique disclosed in Patent Document 2, an insulator layer and an anode lead frame on its outer side are formed to surround the peripheries of four sides of the rectangular cathode layer so as to face the cathode layer and this anode lead frame is connected to the anode body as a connection member from the anode body. Further, for the electrical connection between the lower-side cathode layer and the upper-side cathode layer of the capacitor, which is the foregoing first subject, an opening penetrating the anodized films, the anode body, and so on is provided on the inner side of the anode lead frame and the connection between the two cathode layers is achieved through the inside of the opening, thereby solving such a subject.

This opening has a role different from that of the through holes connected to the anode body of the solid electrolytic capacitor disclosed in Patent Document 1 and is intended for electrical connection between the two cathode layers located on the upper and lower sides of the capacitor. A conductive portion made of a conductive material for electrical connection between the cathode layers is provided at the inner wall surface of the opening while it is electrically insulated from the anode body. Since this conductive portion inside the opening is the same in polarity as the cathode layers, it is necessary to dispose the conductive portion at a position facing the anode lead frame serving as the connection member from the anode body. Therefore, this opening is arranged on the inner side of the anode lead frame. As a result of studies by the inventors, it is known that the characteristics of a capacitor change depending on the positions, sectional area, and number of openings, and it is necessary to design the positions according to the following method.

At first, if the number of openings or the total sectional area thereof is large, cathode layers and an anode body are reduced in area, thus leading to a reduction in capacitance of a solid electrolytic capacitor. However, if the total sectional area of conductive portions serving as electrical connection means in the openings is small, the ESR inside the capacitor increases. Therefore, there is a lower limit to the total sectional area of the openings. This lower limit is also required in terms of processing accuracy of each opening and in terms of necessity for a certain thickness of an insulator layer provided inside each opening for reducing leakage current in the capacitor. For example, in the case where a single opening is formed in the center of a rectangular cathode layer, since a conductive portion in the opening requires a certain sectional area, the sectional area of the opening is also required to be large and there occurs a reduction in capacitance corresponding to this sectional area of the opening. The influence of this problem particularly increases in the case of a multilayer solid electrolytic capacitor in which combinations of cathode-anode-cathode are stacked in layers and, instead, the areas of cathode layers and an anode body per layer are reduced, thereby diminishing the occupation area of the capacitor.

The inventors have paid attention to the position of the opening and made a study to find out a position in a capacitor where the influence on the capacitance is minimized. This study method and the results thereof will be described with reference to FIG. 3. FIG. 3 is an explanatory diagram showing a section of a solid electrolytic capacitor in a direction perpendicular to its thickness direction, in which the section includes a rectangular cathode portion. In FIG. 3, an anode lead portion 27 is provided at the peripheries of four sides of a center cathode layer 26 with an insulator layer 24 interposed therebetween and an opening penetrating them is required to be located at a position where at least a conductive portion provided in the opening can be electrically connected to the cathode layer 26. Herein, the insulator layer 24 and the anode lead portion 27 are divided into a region A and a region B as shown in FIG. 3. The region A is a region where the cathode layer 26 and the anode lead portion 27 directly face each other with the insulator layer 24 interposed therebetween, while, the region B is a region where no cathode layer 26 directly facing the anode lead portion 27 is present.

For reducing the ESL, it is effective that the cathode layer 26 and the anode lead portion 27 face each other. Therefore, the ratio of contribution of the anode lead portion 27 present in the region B to the reduction in ESL is considered to be relatively low. Accordingly, if an opening is provided so as to be located in the region B as much as possible, not only the reduction in area of the cathode layer 26 can be minimized, but also the adverse influence on the reduction in ESL can be suppressed. However, since the opening is for establishing electrical connection between the cathode portions located on the upper and lower sides of the capacitor, it is necessary that the opening be located so as to include a part of the cathode layer 26 or be located at a position where at least a conductive portion provided in the opening can be electrically connected to the cathode layer 26. In the case where the opening is located so as to include a part of the cathode layer 26, it is difficult to completely prevent a reduction in capacitance as compared with the case where no opening is provided. Since the anode lead portion 27 facing the conductive portion provided in the opening is also necessary, it is advantageous, for achieving a reduction in ESL, to leave a part of the anode lead portion 27 in the region B rather than completely removing it.

As described above, it is preferable that, in a solid electrolytic capacitor, openings for establishing electrical connection between two cathode portions being cathode layers located on the upper and lower sides be configured to be provided at four corners of the rectangular cathode portion, respectively. The sectional shape of each opening is not particularly limited, but a circular shape or a square shape is advantageous in terms of the forming process thereof. Although the openings are not necessarily provided at all the four corners of the rectangular cathode portion, a larger number of openings is advantageous for preventing an increase in ESR by increasing the total sectional area of conductive portions formed in the openings. It may be configured that an opening is provided so as to also include a part of the region A in FIG. 3 and electrical connection to the cathode portion is achieved through that portion. Alternatively, it may be configured that a cathode lead for electrical connection is provided so as to extend from the cathode portion into the insulator layer and this cathode lead is electrically connected to a conductive portion in an opening.

Good results are obtained when a conductive portion in an opening is formed by application of a conductive paste. However, instead, it may be configured that a metal foil is bonded to the inner wall surface of an opening by a conductive adhesive. Further, according to the study by the inventors, it is preferable that the ratio of a length of a region removed by providing an opening/openings be set to 25% or less with respect to the total length of a region where a rectangular cathode portion and an anode portion surrounding the peripheries of the cathode portion with an insulator layer interposed therebetween face each other. This is because if this ratio increases, the effect obtained by the facing between the cathode portion and the anode portion decreases, thus causing an increase in ESL. A conductive portion may be provided only at a part of the inner wall surface in an opening or an opening may be entirely filled with a conductive portion. However, in the case of entirely filling the opening with the conductive portion, it is necessary to first provide an insulator layer on the entire inner wall surface where an anode body is exposed inside the opening, thereby providing in advance a structure to surround the entire periphery of the conductive portion. Further, if this opening communicates with another space in a capacitor, it is necessary to form in advance this insulator layer on the surfaces of all conductive regions in the space.

On the other hand, with respect to the foregoing second subject, an electrode substrate is provided on one of surfaces, located in the thickness direction, of a solid electrolytic capacitor and external anode terminals and external cathode terminals are alternately arranged in a checkered pattern on the electrode substrate to realize a plurality of electrode terminals. In this manner, a multi-terminal capacitor is formed. Since the positions of the external anode terminals and the external cathode terminals on the electrode substrate differ from those of a cathode layer and an anode lead portion, inside the capacitor, located below the electrode substrate, it is configured that wiring portions for leading from the cathode layer and the anode lead portion are provided in the electrode substrate, thereby obtaining electrical connection with the cathode layer and electrical connection with the anode lead portion on the lower side of the electrode substrate. Since it is possible to provide wiring portions so as to surround each other in a leading region to the external anode terminals and the external cathode terminals inside the electrode substrate, if the wiring portions are configured to constantly face each other, it is possible to prevent an excessive increase in ESL in the wiring portions.

Specifically, according to this invention, there is provided a solid electrolytic capacitor, wherein:

anodized film portions are formed at both surfaces, perpendicular to a thickness direction, of a flat plate-shaped porous valve action metal, a solid electrolyte layer, a graphite layer, and a metal layer are formed in the order on at least a part of a surface of each of the anodized film portions, thereby forming a cathode portion, and the two cathode portions formed on both sides of the valve action metal each have a rectangular shape, an insulating portion is formed at peripheries of four sides of at least one of the rectangular cathode portions and an anode portion made of a conductive member and electrically connected to the valve action metal is provided so as to face peripheries of the four sides of the cathode portion with the insulating portion interposed therebetween, at least one opening penetrating a part of the valve action metal is provided at a predetermined position including at least one of a part of the insulating portion and a part of the anode portion, an insulating portion and a conductive portion are provided at least a part of an inner wall surface of the opening and the metal layers formed on both sides of the valve action metal are electrically connected to each other by the conductive portion, so that a solid electrolytic capacitor element is formed, and the anode portion and the cathode portion of the solid electrolytic capacitor element are respectively connected to external anode terminals and external cathode terminals of an electrode substrate in which the external anode terminals and the external cathode terminals are provided in the same plane perpendicular to a thickness direction of the electrode substrate.

Further, according to this invention, there is provided a solid electrolytic capacitor, wherein the anode portion made of the conductive member is formed by an anode lead frame, the anode lead frame is electrically connected to the external anode terminals by a conductive adhesive, and the cathode portion is electrically connected to the external cathode terminals by a conductive adhesive.

Further, according to this invention, there is provided a solid electrolytic capacitor, wherein at least one of the anodized film portions formed at both surfaces, perpendicular to the thickness direction, of the valve action metal is partly removed, and the anode lead frame and the valve action metal are connected to each other by welding in a removal region of the anodized film portion.

Further, according to this invention, there is provided a solid electrolytic capacitor, wherein the predetermined positions where the openings are respectively provided are positions each including at least one of a corner of the insulating portion and a corner of the anode portion.

Further, according to this invention, there is provided A solid electrolytic capacitor, wherein the openings are respectively formed at positions including at least corners of the peripheries of the four sides of the rectangular cathode portion and each penetrate a part of the anodized film portion, a part of the solid electrolyte layer, a part of the graphite layer, and a part of the metal layer.

Further, according to this invention, there is provided a solid electrolytic capacitor, wherein a plurality of the openings are provided.

Further, according to this invention, there is provided a solid electrolytic capacitor, wherein the openings are provided in the number of four.

Further, according to this invention, there is provided a solid electrolytic capacitor, wherein a sectional shape of the opening is circular.

Further, according to this invention, there is provided a solid electrolytic capacitor, wherein a sectional shape of the opening is square.

Further, according to this invention, there is provided a solid electrolytic capacitor, wherein a ratio of a length of a region removed by providing the opening is 25% or less with respect to a total length of the peripheries of the four sides of the cathode portion in a region where the peripheries of the four sides of the cathode portion and the anode portion surrounding the cathode portion with the insulating portion interposed therebetween face each other.

Further, according to this invention, there is provided a solid electrolytic capacitor, wherein a cathode lead portion extends from at least one corner of the cathode portion to cross the insulating portion and is electrically connected to the conductive portion formed at the inner wall surface of the opening.

Further, according to this invention, there is provided a solid electrolytic capacitor, wherein the conductive portion is made of a conductive paste provided on a surface of the insulating portion.

Further, according to this invention, there is provided a solid electrolytic capacitor, wherein the conductive portion is in the form of a metal foil bonded to a surface of the insulating portion by a conductive adhesive.

Further, according to this invention, there is provided a solid electrolytic capacitor, wherein the external anode terminals and the external cathode terminals are arranged in a checkered pattern in the same plane perpendicular to the thickness direction of the electrode substrate.

Further, according to this invention, there is provided a solid electrolytic capacitor, wherein a plurality of solid electrolytic capacitor elements are stacked in the thickness direction of the flat plate-shaped valve action metal.

Further, according to this invention, there is provided a solid electrolytic capacitor, wherein the solid electrolyte layer is made of a conductive polymer.

Further, according to this invention, there is provided a solid electrolytic capacitor, wherein the flat plate-shaped porous valve action metal is made of aluminum.

Further, according to this invention, there is provided a solid electrolytic capacitor, wherein the flat plate-shaped porous valve action metal is made of tantalum.

According to this invention, it is possible to achieve a reduction in ESL in a solid electrolytic capacitor using a conductive polymer as an electrolyte, wherein anodized films are formed at both surfaces of a flat plate-shaped anode body, a solid electrolyte layer and a cathode layer are further formed in the order named on each of the anodized films, and further, an anode lead portion is provided at the peripheries of four sides of a rectangular cathode portion comprising the solid electrolyte layer and the cathode layer, with an insulator layer interposed between the cathode portion and the anode lead portion. Means therefor is such that an opening is provided at least one of four corners of the insulator layer or the anode lead portion and a conductive portion in the form of a conductive paste or a metal foil is provided in the opening at its inner wall surface for electrical connection between the cathode portions provided on both sides of the capacitor, thereby establishing electrical connection between the cathode portions on both sides. Further, by controlling the size and shape of the opening so that the ratio of a length of a region removed by providing the opening is set to 25% or less with respect to the total length of the peripheries of the cathode portion, it is possible to realize a reduction in ESL without causing a large increase in ESR or a large reduction in capacitance in the solid electrolytic capacitor.

DESCRIPTION OF THE EXEMPLARY EMBODIMENTS

Figure 1A:
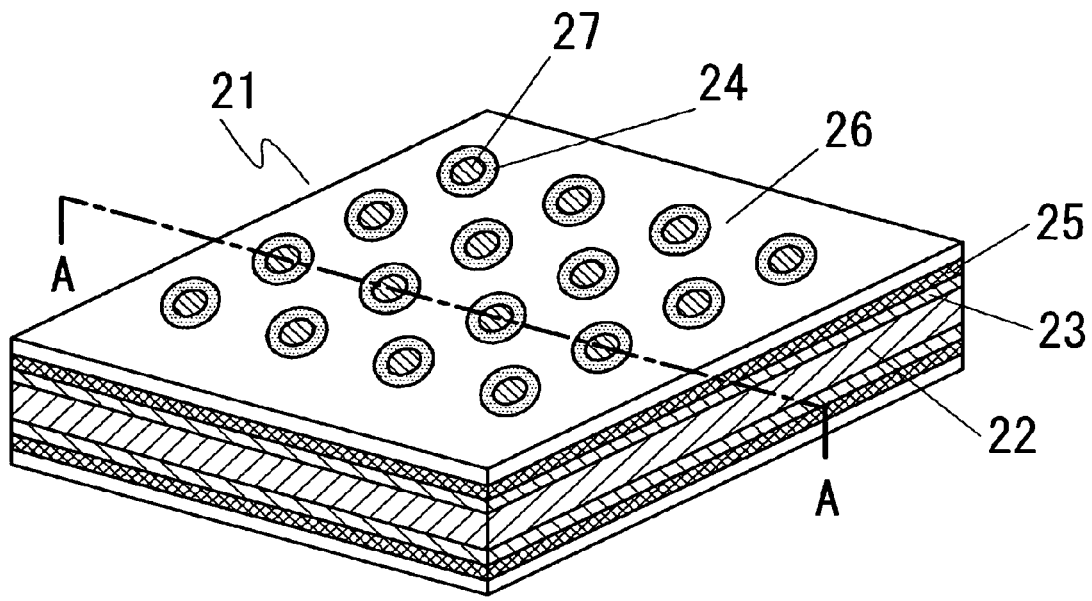
FIG. 1A is a perspective view showing a conventional solid electrolytic capacitor.
Figure 1B:
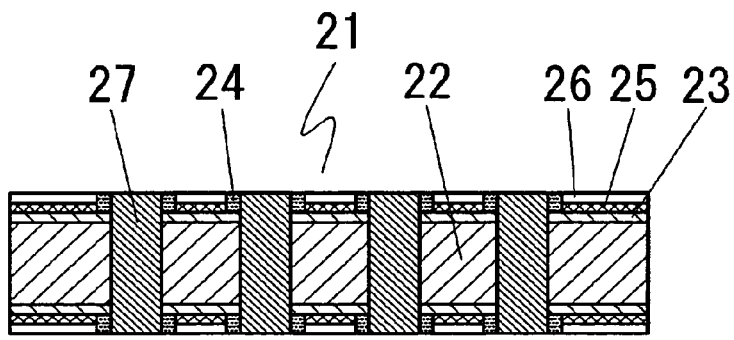
FIG. 1B is a longitudinal sectional view taken along line A-A in FIG. 1A.
Figure 2A:
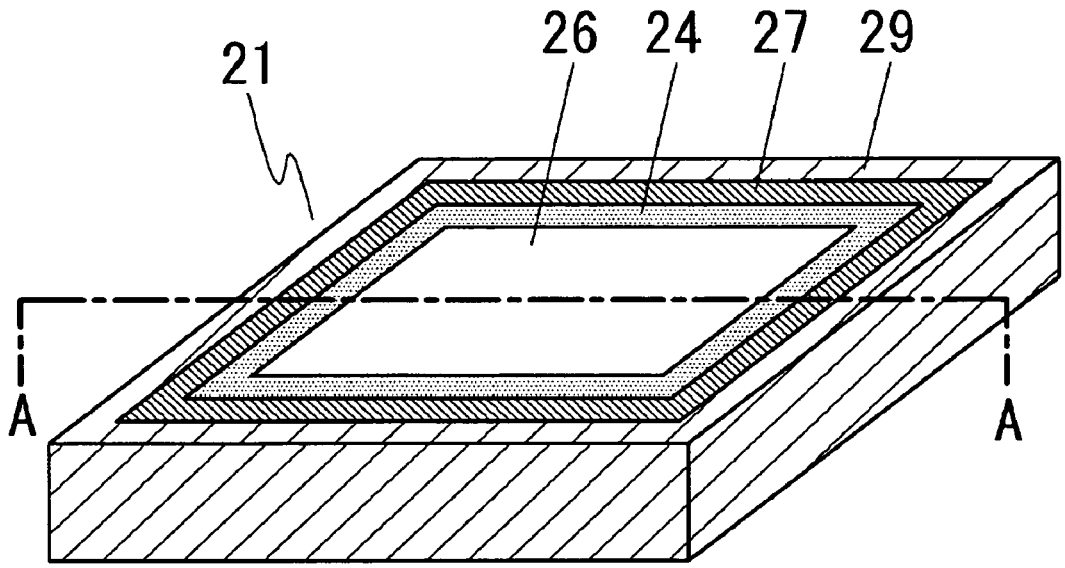
FIG. 2A is a perspective view showing another conventional solid electrolytic capacitor.
Figure 2B:
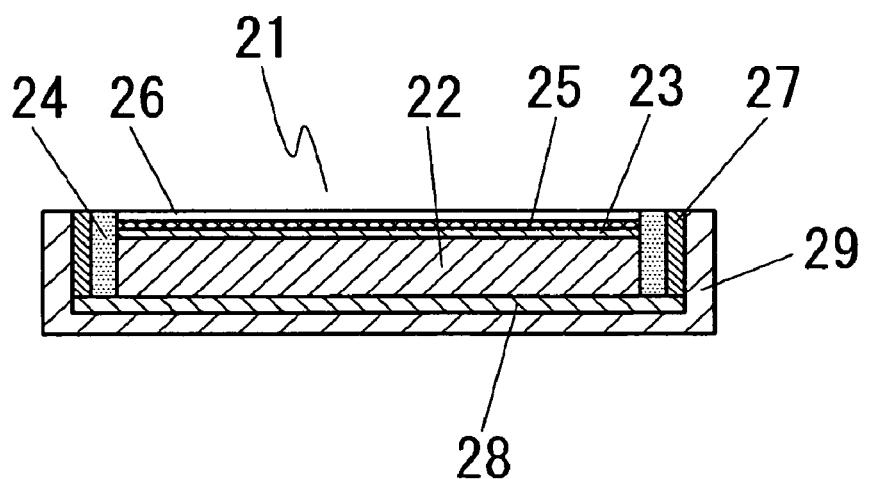
FIG. 2B is a longitudinal sectional view taken along line A-A in FIG. 2A.
Figure 3:
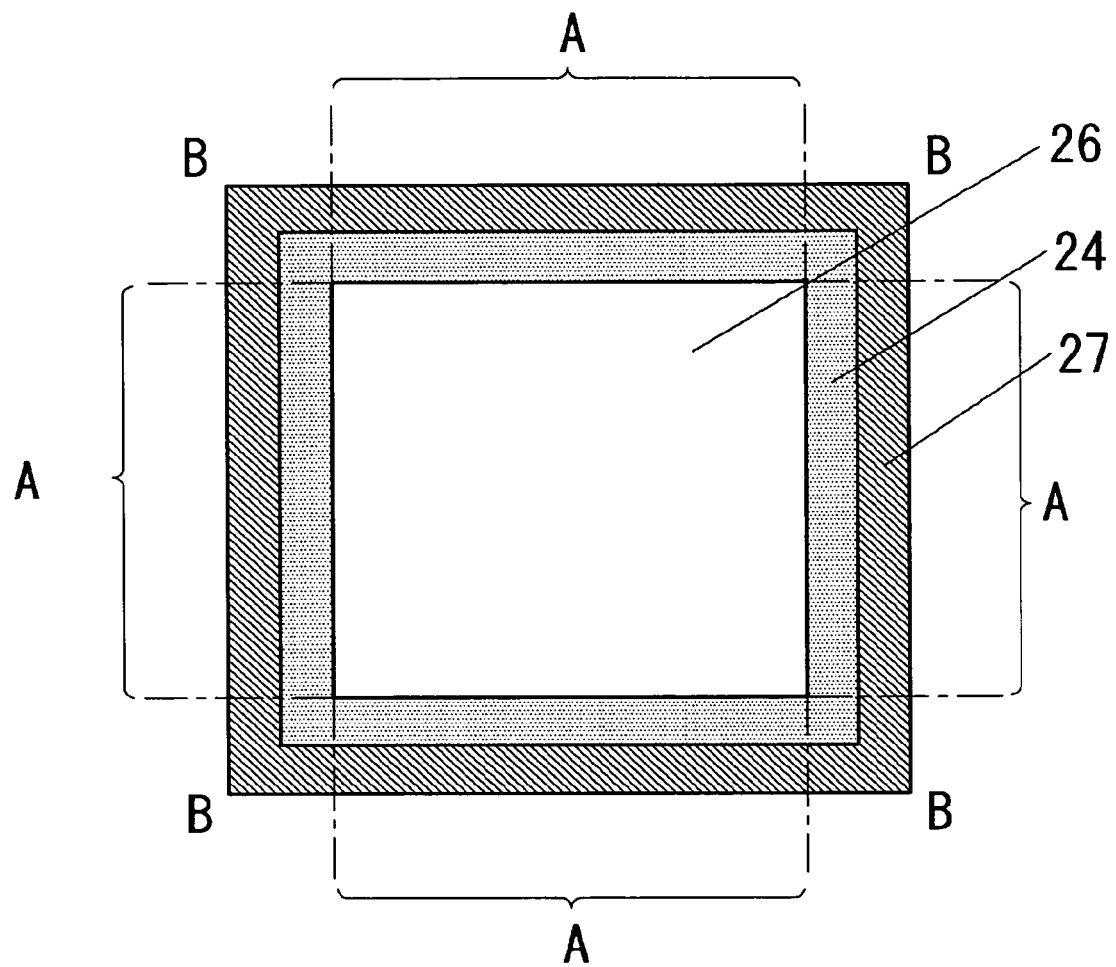
FIG. 3 is an explanatory diagram showing a section of a solid electrolytic capacitor in a direction perpendicular to its thickness direction, wherein the section includes a rectangular cathode portion.
Figure 4A:
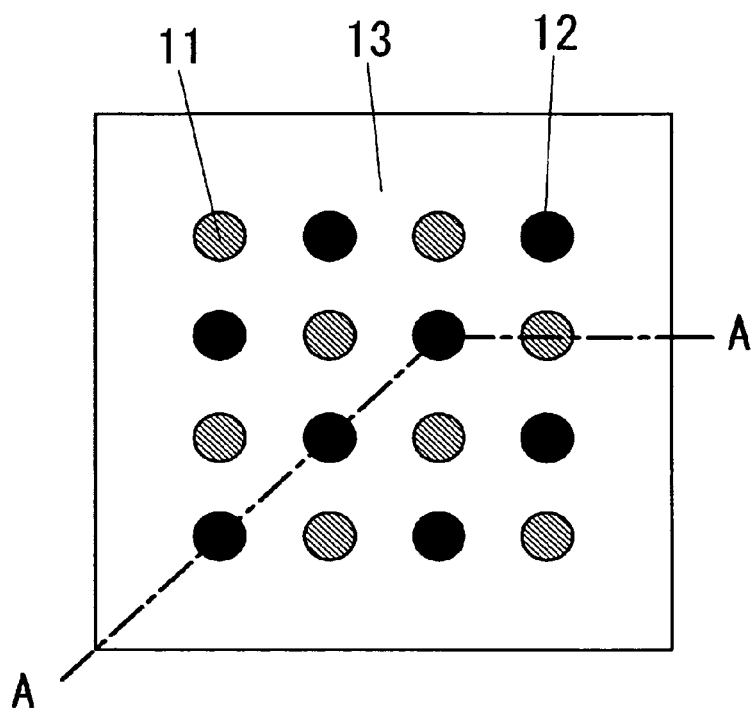
FIG. 4A is a plan view showing a solid electrolytic capacitor according to a first embodiment of this invention.
Figure 4B:
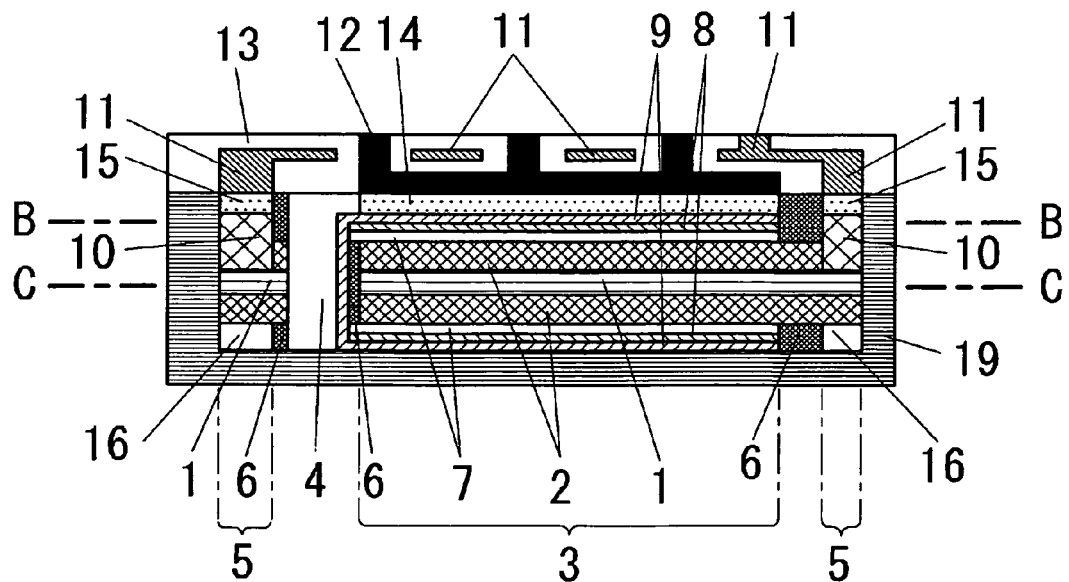
FIG. 4B is a longitudinal sectional view taken along line A-A in FIG. 4A.
Figure 5A:
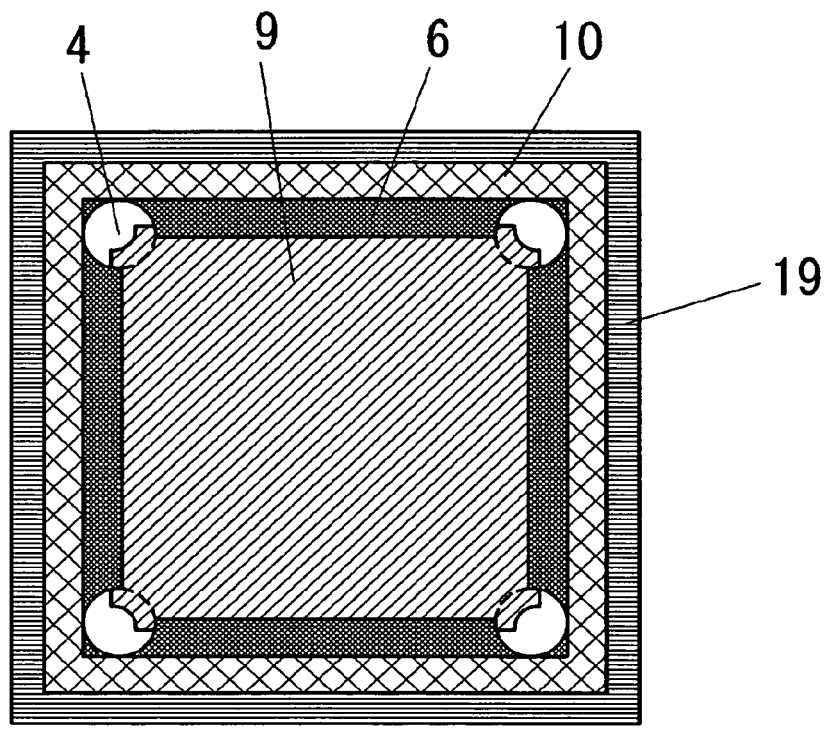
FIG. 5A is a diagram showing the solid electrolytic capacitor according to the first embodiment of this invention and is a cross-sectional view taken along line B-B in FIG. 4B.
Figure 5B:
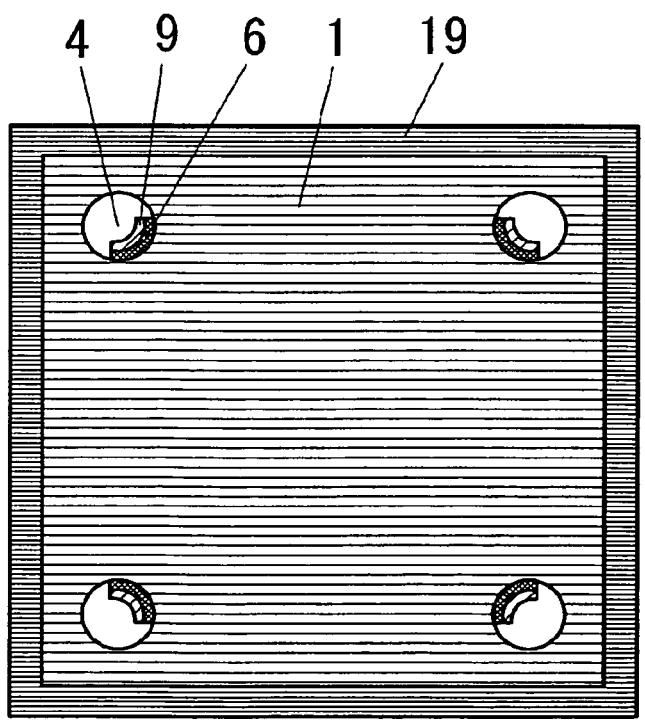
FIG. 5B is a diagram showing the solid electrolytic capacitor according to the first embodiment of this invention and is a cross-sectional view taken along line C-C in FIG. 4B.

With respect to solid electrolytic capacitors according to embodiments of this invention, the structures thereof will be described with reference to FIGS. 4A to 13B. In respective longitudinal sectional views in the figures, the length in the height direction is emphasized as compared with that in the width direction. Among the figures, FIGS. 4A to 5B are explanatory diagrams showing a solid electrolytic capacitor according to a first embodiment of this invention. Herein, FIG. 4A is a plan view thereof. FIG. 4B is a longitudinal sectional view taken along line A-A in FIG. 4A. FIG. 5A is a cross-sectional view taken along line B-B in FIG. 4B. FIG. 5B is a cross-sectional view taken along line C-C in FIG. 4B.

In FIGS. 4A to 5B, an aluminum base 1 is in the form of a square aluminum foil and its both surfaces are formed porous by etching or the like. Anodized films 2 are formed at both surfaces of the aluminum base 1 by anodic oxidation. At the center portion on each side of the aluminum base 1, a solid electrolyte layer 7 of a conductive polymer, a graphite layer 8, and a metal layer 9 of a conductive paste are stacked in this order. In this manner, a square cathode portion 3 is formed. An insulator layer 6 of an epoxy resin or the like is formed at the peripheries of four sides of each cathode portion 3 and, further, an anode lead frame 10 is provided at the peripheries of four sides of the upper insulator layer 6. In this manner, an anode portion 5 is formed. The anode lead frame 10 is in the form of a metal member such as an aluminum foil and serves to establish anode electrical connection between external anode terminals 11 provided at the upper surface of the solid electrolytic capacitor and the aluminum base 1. At a connection portion between the aluminum base 1 and the anode lead frame 10, the anodized film 2 is stripped for electrical connection therebetween and both are connected together preferably by welding or the like.

As shown in FIG. 5B, the aluminum base 1 is formed at its four portions with openings 4 each in the form of a circular through hole extending in the thickness direction of the aluminum base 1. The openings 4 serve to establish electrical connection between the metal layers 9 on the upper and lower sides of the aluminum base 1. The major part of a region of each opening 4 is located at a corner of the insulator layer 6, but the region also reaches a part of a corner of the cathode portion 3, so that a corner of the metal layer 9 extends inside the opening 4 as shown in FIG. 5A. Inside the opening 4, an insulator layer 6 for achieving insulation from the aluminum base 1 is first provided and, on the inner side thereof, a metal layer 9 is provided so as to extend from the cathode portions 3, thereby establishing electrical connection between the cathode portions 3 present on both sides of the aluminum base 1. With this structure, electrical contacts of the cathode portions 3 and the anode portion 5 are concentrated in the upper part of FIG. 4B as the metal layer 9 and the anode lead frame 10, respectively. These are connected to an electrode substrate 13 through mutually insulated conductive adhesives 14 and 15, respectively. Although FIGS. 5A and 5B show the case where the insulator layer 6 and the metal layer 9 are formed only at a part of the inner wall surface in each opening 4, it may be configured that both are filled in each opening 4 over its entire inner region.

At the upper surface of the electrode substrate 13, a plurality of external cathode terminals 12 and external anode terminals 11 are arranged in a checkered pattern as electrical contacts as shown in FIG. 4A. These electrical contacts are led about in the electrode substrate 13 and connected to the metal layer 9 and the anode lead frame 10 through the conductive adhesives 14 and 15, respectively. FIG. 4A shows the case where the external cathode terminals 12 and the external anode terminals 11 are present in the number of eight, respectively. Although the insulator layer 6 and the anode lead frame 10 are provided at the peripheries of the four sides of the square cathode portion 3 on the upper side of the aluminum base 1, no anode lead frame 10 is present on the lower side of the aluminum base 1 and a space 16 is provided in a region corresponding to the anode lead frame 10 on the upper side. Further, the anodized film 2 is not stripped from the aluminum base 1 at a portion corresponding to the space 16. These respective elements are finally sealed and fixed in a resin case 19, thereby forming the solid electrolytic capacitor using the conductive polymer as the electrolyte.

Figure 6A:
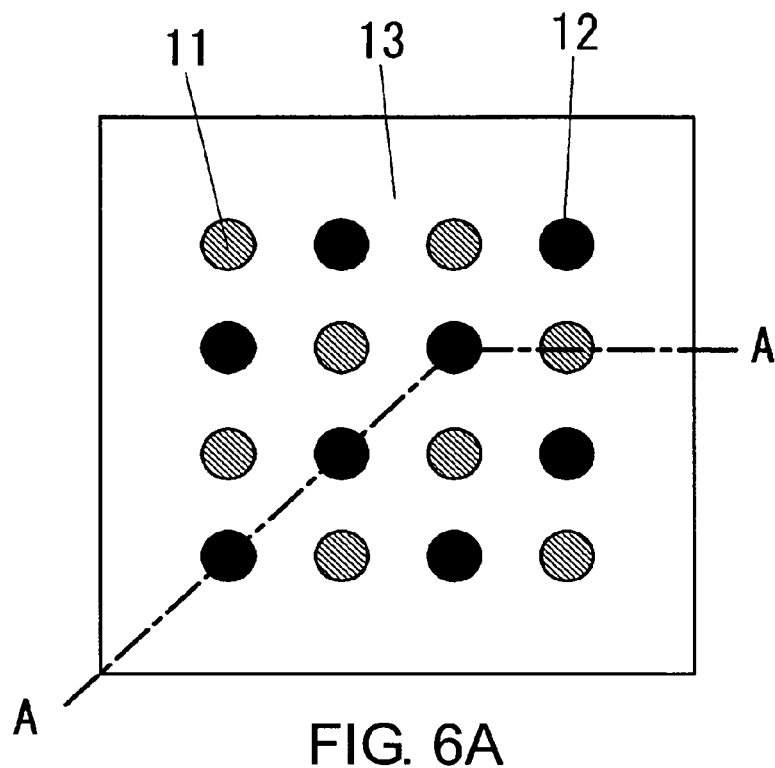
FIG. 6A is a plan view showing a solid electrolytic capacitor according to a second embodiment of this invention.
Figure 6B:
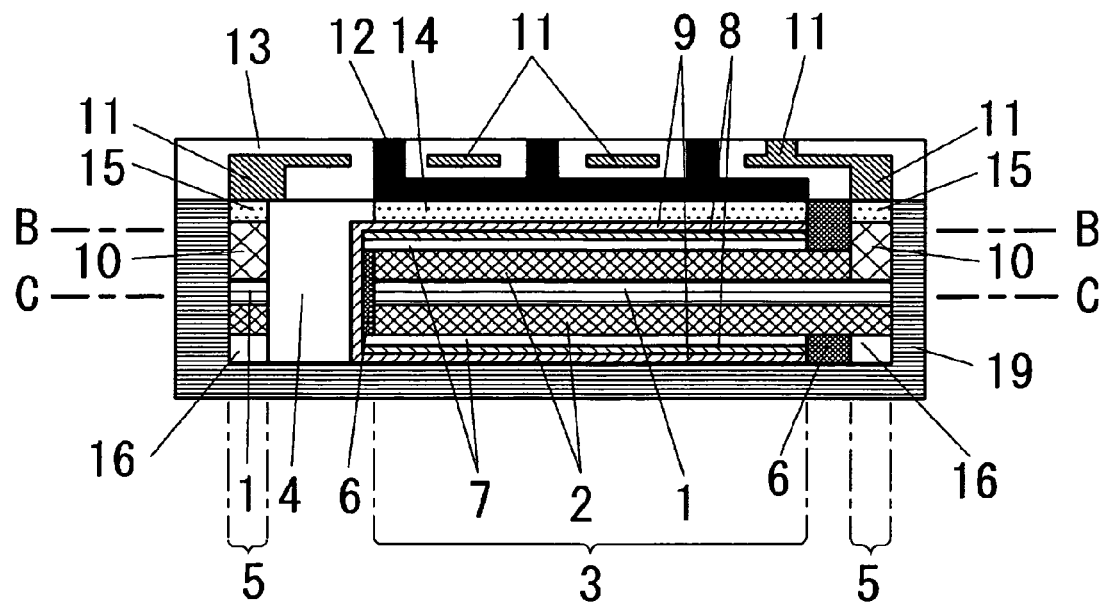
FIG. 6B is a longitudinal sectional view taken along line A-A in FIG. 6A.
Figure 7A:
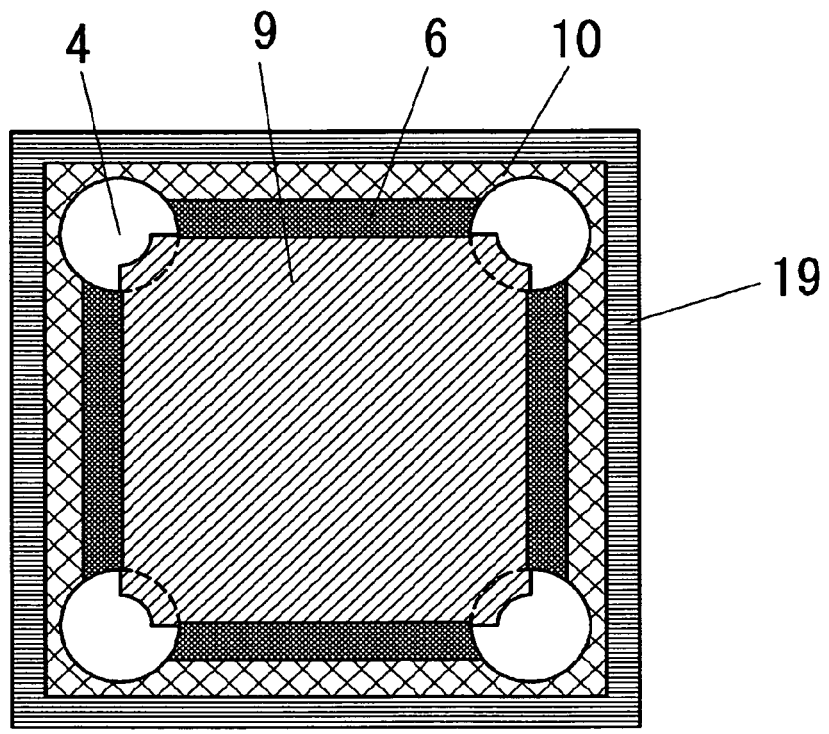
FIG. 7A is a diagram showing the solid electrolytic capacitor according to the second embodiment of this invention and is a cross-sectional view taken along line B-B in FIG. 6B.
Figure 7B:
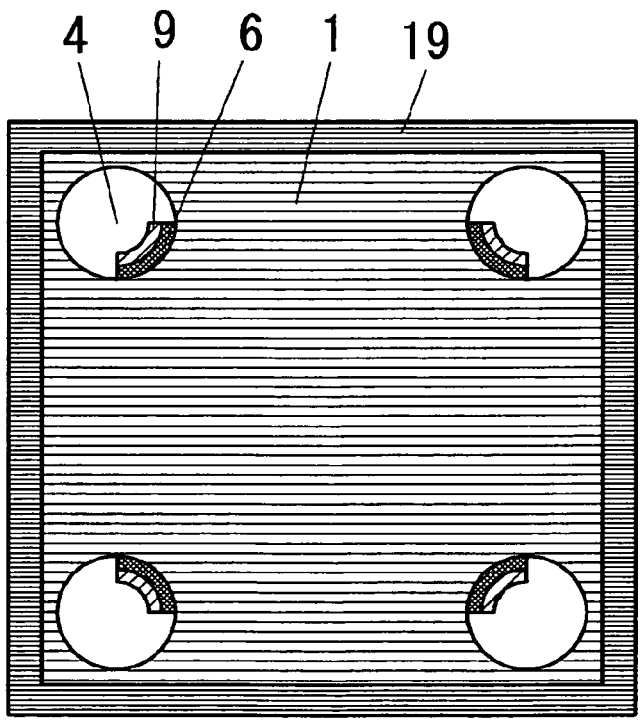
FIG. 7B is a diagram showing the solid electrolytic capacitor according to the second embodiment of this invention and is a cross-sectional view taken along line C-C in FIG. 6B.

FIGS. 6A to 7B are diagrams showing a solid electrolytic capacitor according to a second embodiment of this invention. Herein, FIG. 6A is a plan view thereof. FIG. 6B is a longitudinal sectional view taken along line A-A in FIG. 6A. FIG. 7A is a cross-sectional view taken along line B-B in FIG. 6B. FIG. 7B is a cross-sectional view taken along line C-C in FIG. 6B. In FIGS. 6A to 7B, the structures of an aluminum base 1, anodized films 2, solid electrolyte layers 7, graphite layers 8, metal layers 9, insulator layers 6, an anode lead frame 10, an electrode substrate 13, and so on, the positions of conductive adhesives 14 and 15, and the number and positions of external anode terminals 11 and external cathode terminals 12 arranged at the upper surface of the electrode substrate 13 are the same as those in the solid electrolytic capacitor according to the foregoing first embodiment.

The second embodiment differs from the first embodiment in that the diameter of each circular opening 4 is much greater than that in the first embodiment. As opposed to the first embodiment, a region of each opening 4 is located so as to cut off a part of the anode lead frame 10 located on the outer side thereof as shown in FIG. 7A. Further, the cut-off area of the solid electrolyte layer 7, the graphite layer 8, and the metal layer 9 forming each cathode portion 3 increases as compared with that in the first embodiment. Although FIGS. 7A and 7B show the case where the insulator layer 6 and the metal layer 9 are formed only at a part of the inner wall surface in each opening 4, it may be configured that both are filled in each opening 4 over its entire inner region like in the foregoing first embodiment. However, there is an upper limit to a total region occupied by the openings 4 such that the ratio of the length of the total region removed by the openings 4 should be set to 25% or less in the total length of a region where the rectangular cathode portion 3 and the anode portion 5 surrounding the outer side thereof with the insulator layer 6 interposed therebetween face each other. If the total sectional area of the openings 4 exceed this ratio, the ESL of the capacitor increases so that the object of this invention cannot be accomplished.

Figure 8A:
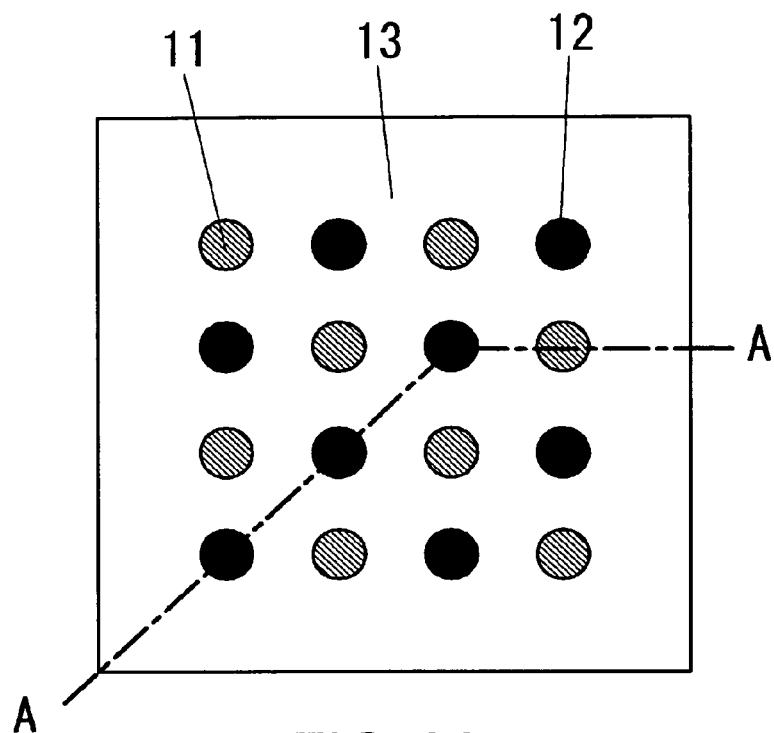
FIG. 8A is a plan view showing a solid electrolytic capacitor according to a third embodiment of this invention.
Figure 8B:
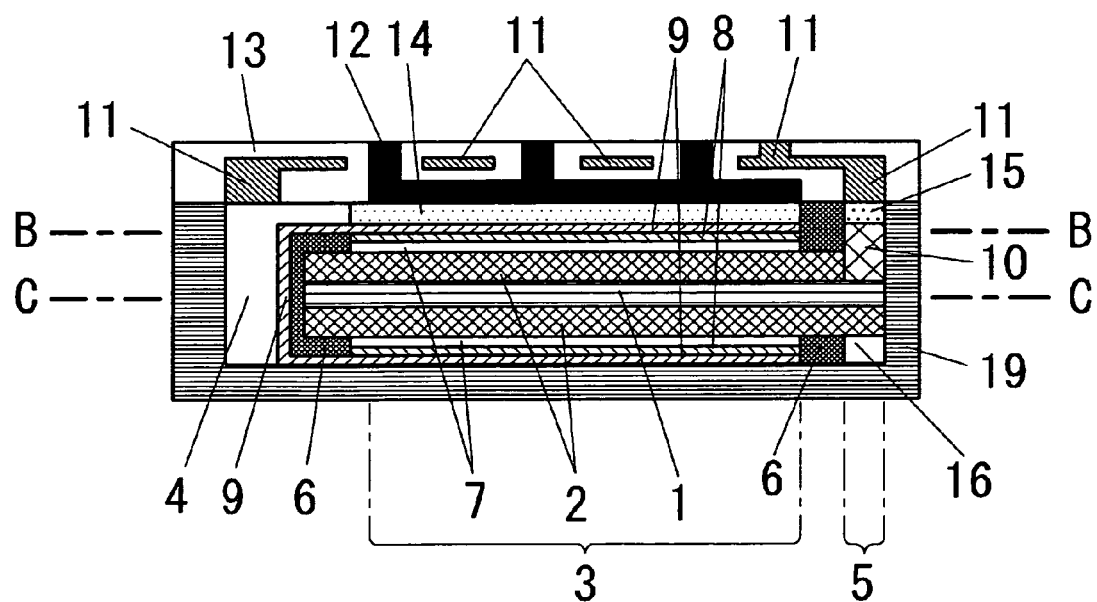
FIG. 8B is a longitudinal sectional view taken along line A-A in FIG. 8A.
Figure 9A:
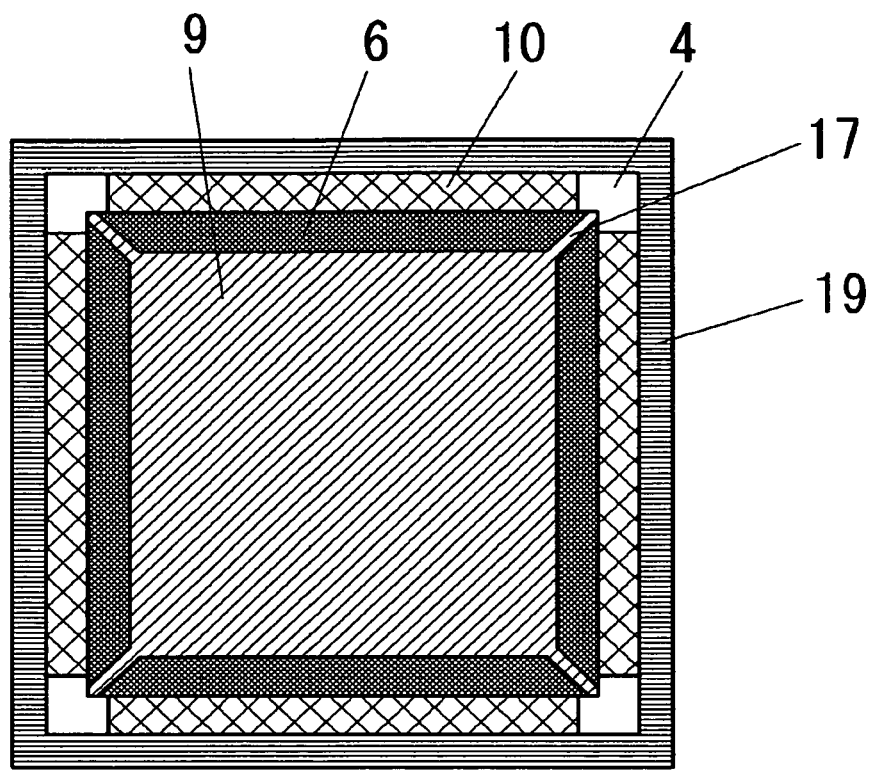
FIG. 9A is a diagram showing the solid electrolytic capacitor according to the third embodiment of this invention and is a cross-sectional view taken along line B-B in FIG. 8B.
Figure 9B:
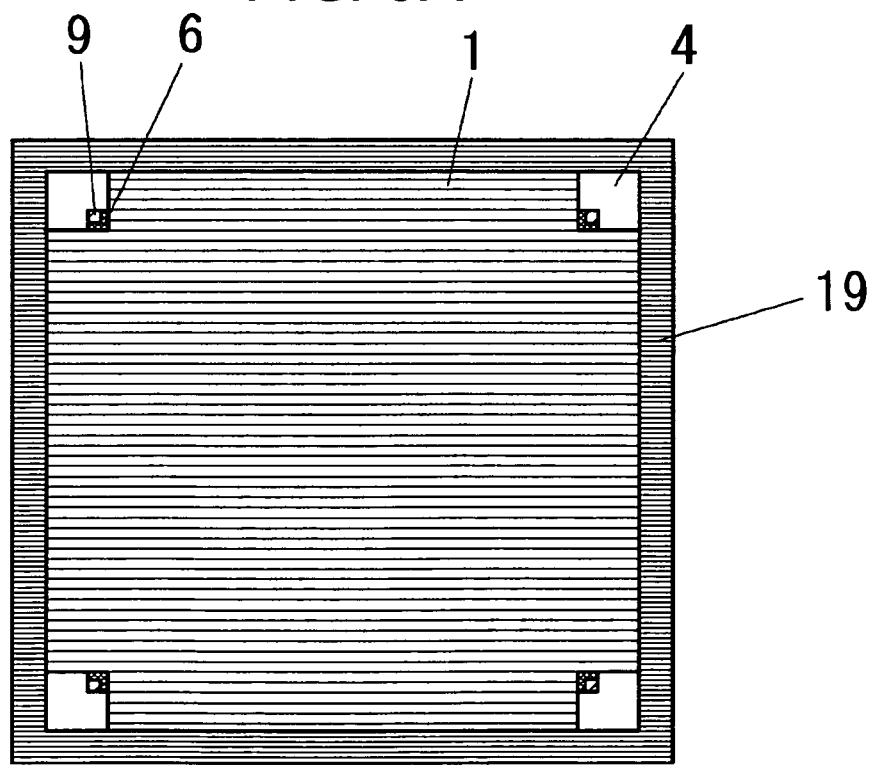
FIG. 9B is a diagram showing the solid electrolytic capacitor according to the third embodiment of this invention and is a cross-sectional view taken along line C-C in FIG. 8B.

FIGS. 8A to 9B are diagrams showing a solid electrolytic capacitor according to a third embodiment of this invention. Herein, FIG. 8A is a plan view thereof. FIG. 8B is a longitudinal sectional view taken along line A-A in FIG. 8A. FIG. 9A is a cross-sectional view taken along line B-B in FIG. 8B. FIG. 9B is a cross-sectional view taken along line C-C in FIG. 8B. In FIGS. 8A to 9B, the structures of an aluminum base 1, anodized films 2, solid electrolyte layers 7, graphite layers 8, metal layers 9, insulator layers 6, an anode lead frame 10, an electrode substrate 13, and so on, the positions of conductive adhesives 14 and 15, and the number and positions of external anode terminals 11 and external cathode terminals 12 arranged at the upper surface of the electrode substrate 13 are the same as those in the solid electrolytic capacitor according to the foregoing first embodiment.

The third embodiment differs from the first embodiment in that openings 4 each have a square shape and, as opposed to the first embodiment, a region of each opening 4 is located only at a corner of the anode portion 5 and does not reach either the cathode portion 3 or the insulator layer 6 as shown in FIG. 9A. Herein, the metal layer 9 is formed on the inner wall surface of each opening 4 with the insulator layer 6 interposed therebetween. A method for electrical connection from the upper and lower metal layers 9 to the inside of each opening 4 is optional. As one example thereof, the embodiment shown in FIGS. 8A to 9B employs a method that partly removes the upper and lower insulator layers 6 to form grooves thereon and provides cathode lead portions 17 in the grooves. Although FIGS. 9A and 9B show the case where the insulator layer 6 and the metal layer 9 are formed only at a part of the inner wall surface in each opening 4, it may be configured that both are filled in each opening 4 over its entire inner region like in the foregoing first embodiment. In this third embodiment, no region is removed by the openings 4 with respect to the cathode portions 3 and, further, no region is present that is removed by the openings 4 in a region where the anode portion 5 surrounds the cathode portion 3 with the insulator layer 6 interposed therebetween. Therefore, the ratio of the total length removed by the openings 4 is 0% in such a region.

Figure 10A:
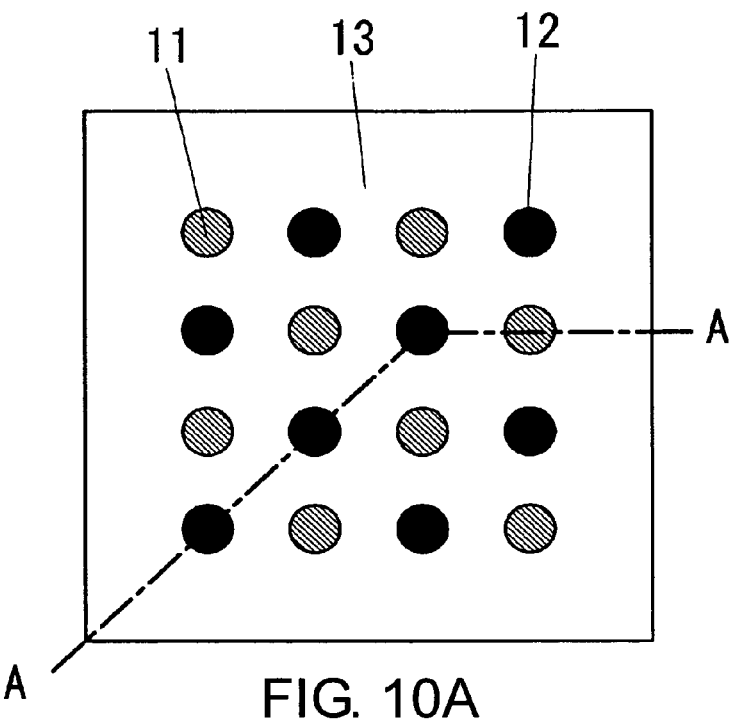
FIG. 10A is a plan view showing a solid electrolytic capacitor according to a fourth embodiment of this invention.
Figure 10B:
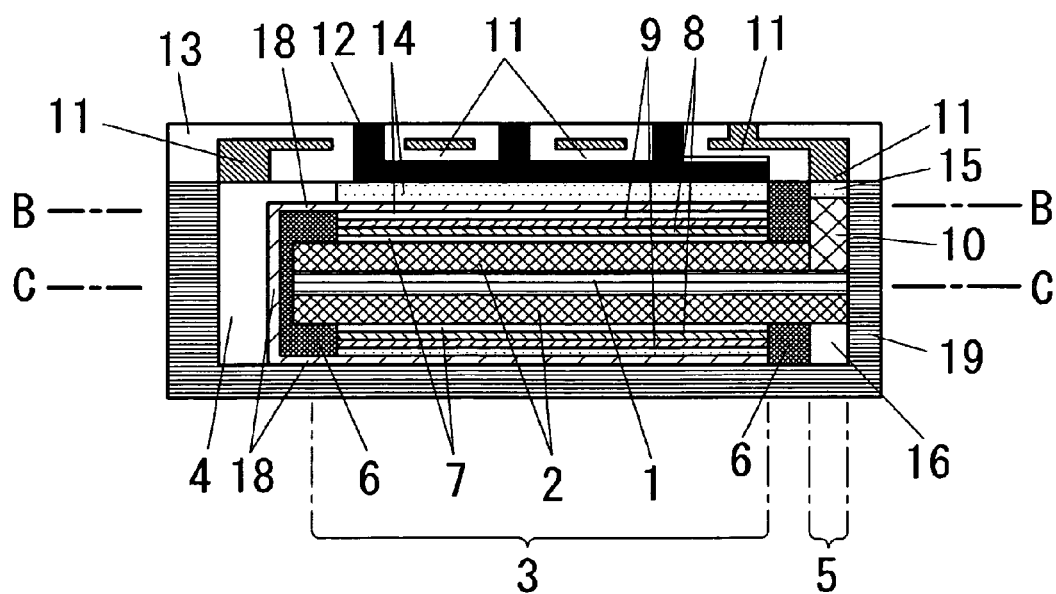
FIG. 10B is a longitudinal sectional view taken along line A-A in FIG. 10A.
Figure 11A:
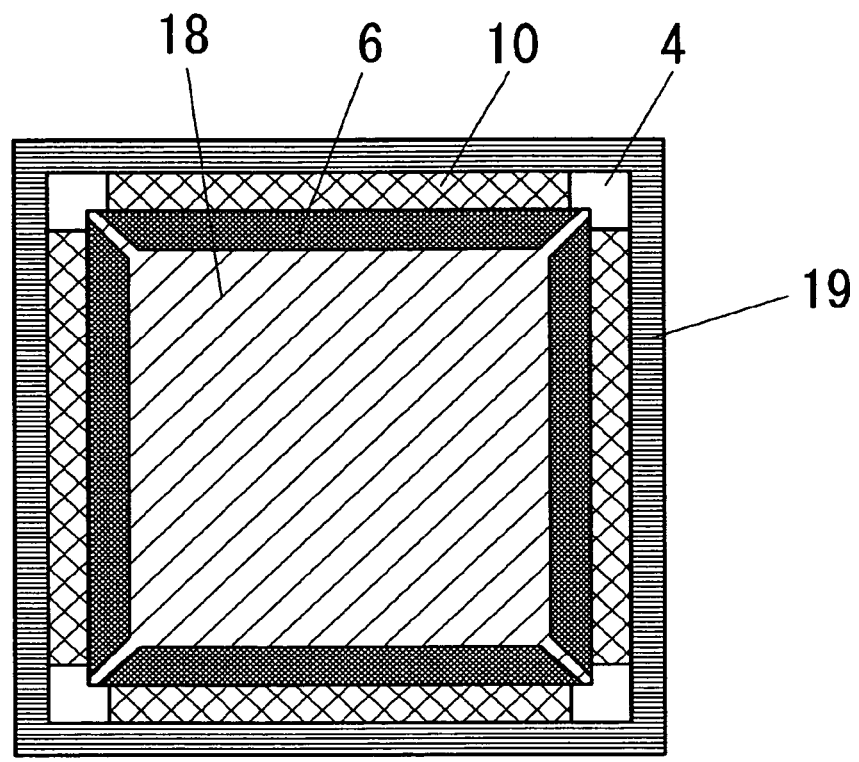
FIG. 11A is a diagram showing the solid electrolytic capacitor according to the fourth embodiment of this invention and is a cross-sectional view taken along line B-B in FIG. 10B.
Figure 11B:
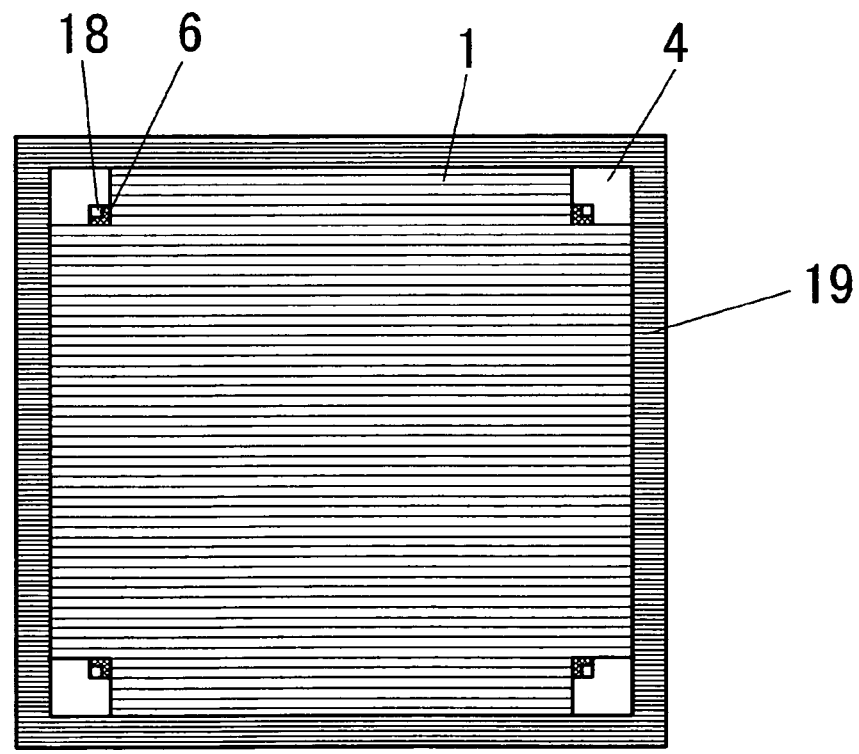
FIG. 11B is a diagram showing the solid electrolytic capacitor according to the fourth embodiment of this invention and is a cross-sectional view taken along line C-C in FIG. 10B.

FIGS. 10A to 11B are diagrams showing a solid electrolytic capacitor according to a fourth embodiment of this invention. Herein, FIG. 10A is a plan view thereof. FIG. 10B is a longitudinal sectional view taken along line A-A in FIG. 10A. FIG. 11A is a cross-sectional view taken along line B-B in FIG. 10B. FIG. 11B is a cross-sectional view taken along line C-C in FIG. 10B. In FIGS. 10A to 11B, the structures of an aluminum base 1, anodized films 2, solid electrolyte layers 7, graphite layers 8, metal layers 9, insulator layers 6, an anode lead frame 10, an electrode substrate 13, and so on, the number and positions of external anode terminals 11 and external cathode terminals 12 arranged at the upper surface of the electrode substrate 13, and the positions and shape of openings 4 are the same as those in the solid electrolytic capacitor according to the foregoing third embodiment.

The fourth embodiment differs from the third embodiment in that a metal foil 18 is used for electrical connection in each opening 4. In FIG. 10B, a layer of a conductive adhesive 14 is formed on the surface of each of the metal layers 9 located at the outermost portions of the cathode portions 3 provided on both sides of the aluminum base 1 and the metal foil 18 is disposed on the layer of the conductive adhesive 14. End portions of each metal foil 18 at its four corners are caused to extend inside the openings 4 and fixed to the inner wall surfaces of the openings 4 through the insulator layer 6, respectively. A copper foil with silver-plated surfaces on both sides is suitable as the metal foil 18. The conductive adhesive 14 is again applied to the surface of the upper metal foil 18 so as to be connected to the electrode substrate 13 along with a conductive adhesive 15 provided on the anode portion 5. The electrical connection between the two cathode portions by means of the metal foil 18 is considered excellent in terms of the electrical characteristics, but the capacitor fabrication process becomes somewhat complicated as compared with that in the third embodiment. In this fourth embodiment, like in the third embodiment, the ratio of the total length removed by the openings 4 is 0% in a region where the anode portion 5 surrounds the cathode portion 3.

Figure 12A:
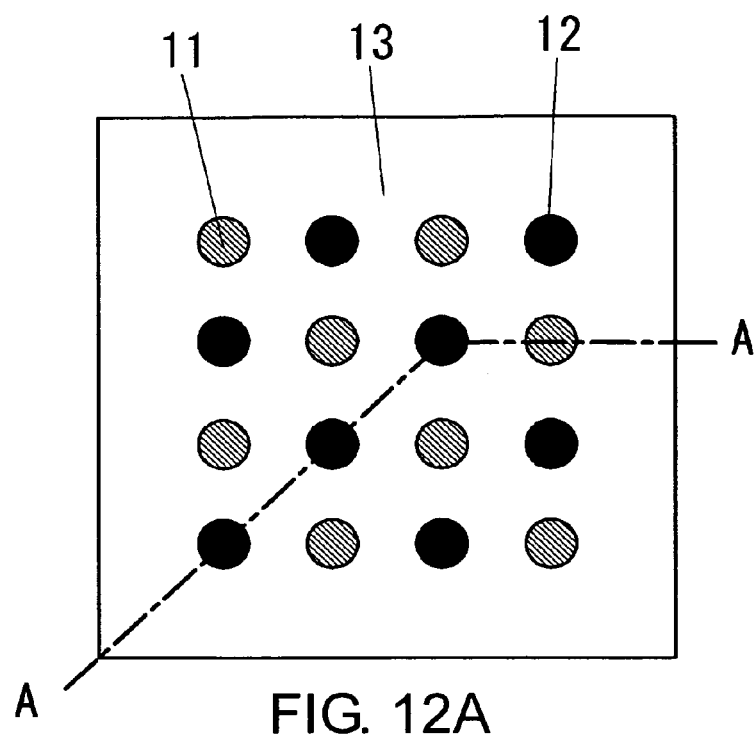
FIG. 12A is a plan view showing a solid electrolytic capacitor according to a fifth embodiment of this invention.
Figure 12B:
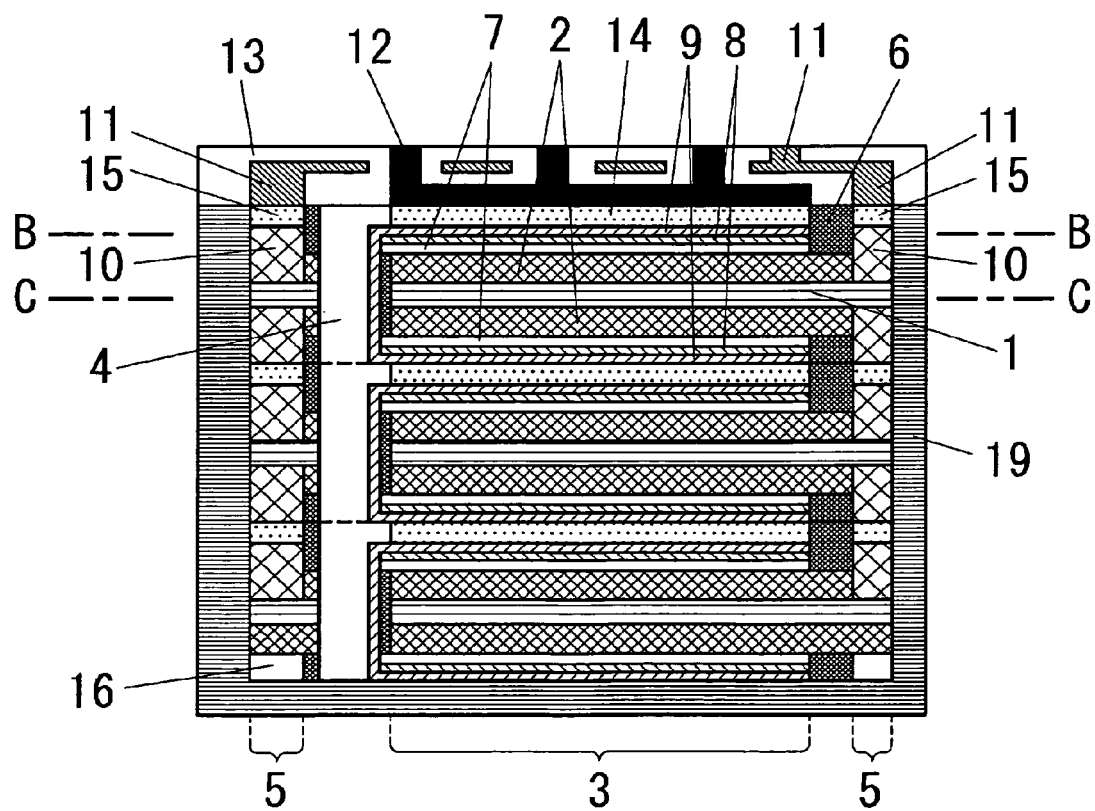
FIG. 12B is a longitudinal sectional view taken along line A-A in FIG. 12A.
Figure 13A:
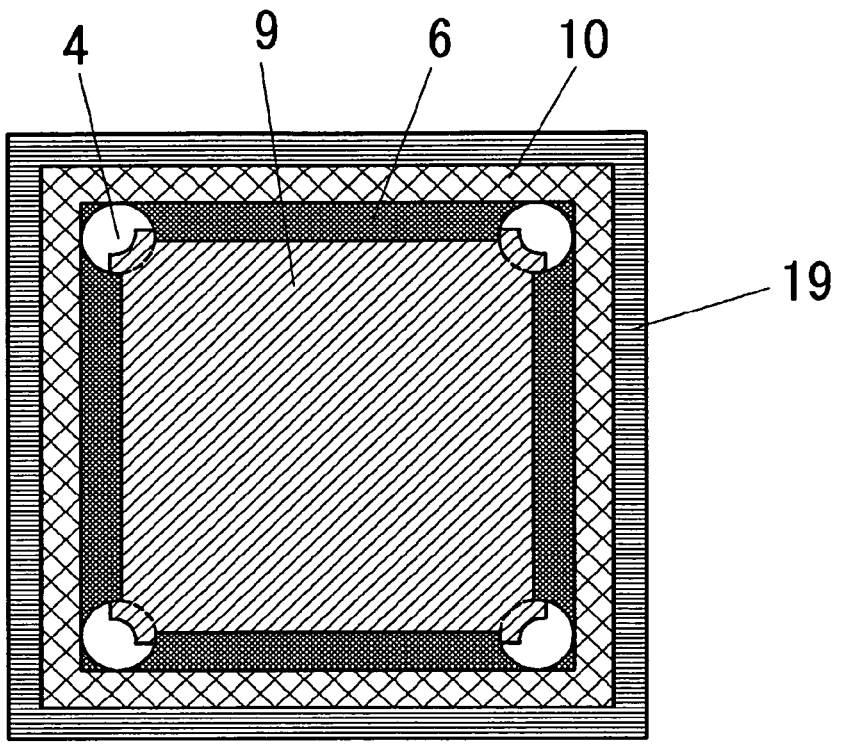
FIG. 13A is a diagram showing the solid electrolytic capacitor according to the fifth embodiment of this invention and is a cross-sectional view taken along line B-B in FIG. 12B.
Figure 13B:
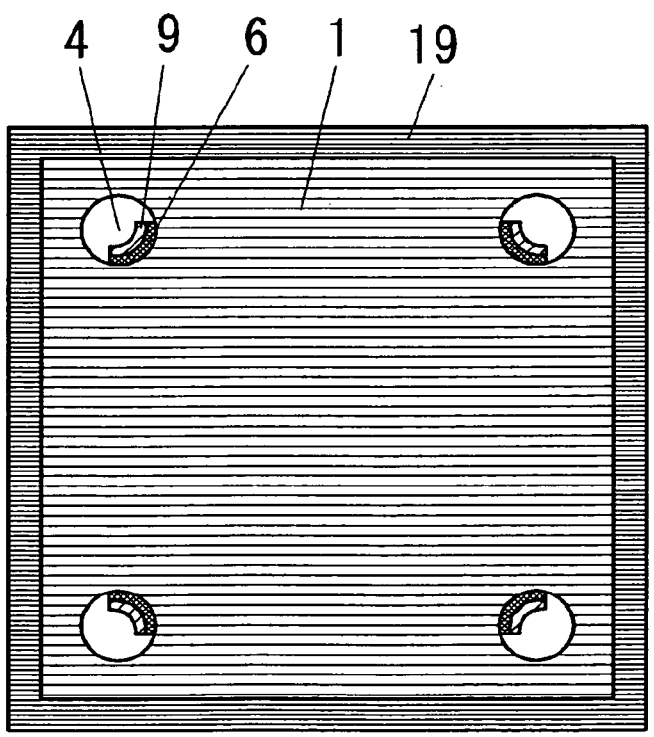
FIG. 13B is a diagram showing the solid electrolytic capacitor according to the fifth embodiment of this invention and is a cross-sectional view taken along line C-C in FIG. 12B.

FIGS. 12A to 13B are diagrams showing a solid electrolytic capacitor according to a fifth embodiment of this invention. Herein, FIG. 12A is a plan view thereof. FIG. 12B is a longitudinal sectional view taken along line A-A in FIG. 12A. FIG. 13A is a cross-sectional view taken along line B-B in FIG. 12B. FIG. 13B is a cross-sectional view taken along line C-C in FIG. 12B. The fifth embodiment differs from the foregoing first embodiment in that a plurality of capacitor elements are vertically stacked, and FIGS. 12A to 13B show the case where the capacitor elements are stacked in three stages. In FIGS. 12A to 13B, the structures of an aluminum base 1, anodized films 2, solid electrolyte layers 7, graphite layers 8, metal layers 9, insulator layers 6, an anode lead frame 10, and so on, the positions and shape of openings 4, and a method for electrical connection from the upper and lower metal layers 9 to the inside of each opening 4, in each capacitor element, are basically the same as those in the solid electrolytic capacitor according to the foregoing first embodiment. Further, the structure of an electrode substrate 13 located on the uppermost capacitor element and the number and positions of external anode terminals 11 and external cathode terminals 12 arranged at the upper surface of the electrode substrate 13 are also the same as those in the foregoing first embodiment.

However, in each of the uppermost and middle capacitor elements shown in FIG. 12B, an anode lead frame 10 is also provided on the lower side of the aluminum base 1, like on the upper side thereof, at the outermost portion where a space is provided in the first embodiment, and the anodized film 2 is stripped from the aluminum base 1 at its portion being in contact with this anode lead frame 10. On the other hand, in the lowermost capacitor element, a space 16 is provided at its outermost portion on the lower side of the aluminum base 1 like in the first embodiment. Electrical connection between these three-stage capacitor elements is achieved by conductive adhesives such that mutually facing cathode portions 3 are connected together by a conductive adhesive 14 and mutually facing anode portions 5 are connected together by a conductive adhesive 15. With this structure, in the solid electrolytic capacitor according to this fifth embodiment, it is possible to obtain the capacitance equal to that obtained when the capacitors according to the first embodiment are connected in parallel with each other.

EXAMPLES

Example 1

The solid electrolytic capacitor according to the foregoing first embodiment was fabricated by the following method and its electrical characteristics were measured. At first, a foil-like aluminum base was formed porous and, then, anodized films were formed at both surfaces thereof. Herein, the foil-like aluminum base is commercialized as a material for an aluminum electrolytic capacitor, wherein the nominal anodization voltage when forming anodized films at its surfaces is 3V, the capacitance per unit area ($cm^2$) is 220 μF, and the thickness is 70 μm. This foil-like aluminum base was cut into a square shape with a width of 4.5 mm and a length of 4.5 mm and it was determined to form a cathode portion in a square region with a width of 3.2 mm and a length of 3.2 mm in the center of the aluminum base on each side thereof. Then, openings in the form of circular through holes were formed in the aluminum base in its thickness direction, using as the centers of circles the positions corresponding to the four vertices of the 3.2 mm square region determined for the cathode portion. The diameter of each opening was 0.26 mm.

Further, in order to insulate the cathode portions from the ambient, an epoxy resin was screen-printed so as to surround the peripheries of four sides of the region determined for the cathode portion on each side of the aluminum base, thereby forming an insulator layer on each side of the aluminum base. Each insulator layer had a width of 0.3 mm and a thickness of 20 μm. The insulator layer also entered the four openings so as to cover at least a part of the inner wall surface of each opening. Then, a solid electrolyte layer of a conductive polymer was formed on the surface of the anodized film on each side of the aluminum base. The conductive polymer was obtained by reacting 3,4-ethylenedioxythiophene as a monomer, ammonium peroxodisulfate as an oxidant, and paratoluenesulfonic acid as a dopant in a mole ratio of 6:1:2, respectively. Then, a graphite layer with a thickness of 10 μm was formed on the surface of each solid electrolyte layer by screen printing.

Subsequently, on each graphite layer and the insulator layer on the inner wall surface of each opening, a layer of a low-temperature baking type conductive paste (trade name: XA-9053, manufactured by Fujikura Kasei Co., Ltd.) obtained by mixing silver oxide nanoparticles and an organic silver compound in a weight ratio of 2:1 was formed to a thickness of 20 μm, then was left standing at 150° C. to volatilize an organic solvent in the conductive paste, and then was heat-treated at 220° C. for 1 minute or more, thereby forming a metal layer. By this method, the square cathode portion comprising the solid electrolyte layer, the graphite layer, and the metal layer was formed on each side of the aluminum base. The metal layer was also formed on the surface of the insulator layer in each opening, thereby enabling electrical connection between the cathode portions on both sides of the aluminum base through the four openings. Then, one of the anodized films on the aluminum base was removed only at its portion located on the outer side of the insulator layer to thereby expose the aluminum base and an anode lead frame was welded to the aluminum base at its portion where the anodized film was removed, thereby forming an anode portion. The anode portion had a shape surrounding the outer side of the square cathode portion with the insulator layer interposed therebetween and the ratio of the length of a total region occupied by the openings (the ratio of the openings) was set to 8% with respect to the total length of a region where the cathode portion and the anode portion face each other.

Thereafter, an electrode substrate having a surface at which eight external anode terminals and eight external cathode terminals were arranged at regular intervals in a checkered pattern was bonded to the surfaces of the anode lead frame and the metal layer forming the anode portion and the cathode portion, respectively, using a conductive adhesive. Finally, a resin case was prepared and the composite of the capacitor element and the electrode substrate fabricated by the above method was incorporated and fixed in the resin case, thereby completing a solid electrolytic capacitor using the conductive polymer as the electrolyte. The number of solid electrolytic capacitors fabricated by this method was 30.

The electrical characteristics of the fabricated 30 solid electrolytic capacitors were measured. Measurement items were four items of capacitance, ESR, ESL, and leakage current. The capacitance and the ESR were both measured by an AC impedance bridge method. The capacitance measurement conditions were such that the frequency of an applied reference signal was 120 Hz, the potential difference was 1 Vrms, and the DC bias was 0V. On the other hand, the ESR measurement conditions were such that the frequency of an applied reference signal was 100 kHz, the potential difference was 1 Vrms, and the DC bias was 0V. With respect to the ESL, the solid electrolytic capacitor was soldered to a predetermined evaluation board to measure S21 characteristics (transfer characteristics) at 100 MHz using a network analyzer and then the ESL was calculated by performing a simulation with an equivalent circuit on the basis of the results of the measurement. With respect to the leakage current, a signal of 2.5V being a rated voltage of the solid electrolytic capacitor was applied and a value after 1 minute was measured. The average values of the respective characteristics of the fabricated 30 solid electrolytic capacitors are shown at Example 1 in Table 1 along with a value of the foregoing ratio of the openings.

Example 2

The solid electrolytic capacitor according to the foregoing second embodiment was fabricated and its electrical characteristics were measured. The size and shape of the fabricated solid electrolytic capacitor and the fabrication sequence were substantially the same as those in Example 1. However, circular openings formed in an aluminum base in its thickness direction using as the centers of circles the positions of the four vertices of a 3.2 mm square region determined for a cathode portion were through holes each having a diameter of 0.8 mm. By setting the diameter of each opening to be about three times greater than that in Example 1, the ratio of the openings was increased to 25%. The number of solid electrolytic capacitors fabricated and used in the measurement was 30 equal to that in Example 1. Measurement items and a measurement method were also the same as those in Example 1. The average values of the respective characteristics of the 30 solid electrolytic capacitors are shown at Example 2 in Table 1 along with the value of the ratio of the openings.

Example 3

The solid electrolytic capacitor according to the foregoing third embodiment was fabricated and its electrical characteristics were measured. The size and shape of the fabricated solid electrolytic capacitor and the fabrication sequence were substantially the same as those in Example 1. However, instead of the circular openings, square openings each having a width of 0.35 mm and a length of 0.35 mm were formed at four corners of an aluminum base, in its thickness direction, having a width of 4.5 mm and a length of 4.5 mm. A region of each opening was located only at an anode portion on the aluminum base and did not reach a cathode portion or an insulator layer. Therefore, there was no region occupied by the openings in a region where the anode portion and the cathode portion faced each other and thus the ratio of the openings was 0%.

The openings and the cathode portions were isolated from each other by the insulator layers, but when forming metal layers each having a thickness of 20 μm after printing graphite layers, the metal layer was caused to also extend over each insulator layer at its portions between the cathode portion and the openings, thereby forming cathode lead portions. Like in Example 1, the metal layer was also formed on the surface of the insulator layer in each opening, thereby establishing electrical connection between the cathode portions on both sides of the aluminum base through the four openings. The number of solid electrolytic capacitors fabricated and used in the measurement was 30 equal to that in Example 1. Measurement items and a measurement method were also the same as those in Example 1. The average values of the respective characteristics of the 30 solid electrolytic capacitors are shown at Example 3 in Table 1 along with the value of the ratio of the openings.

Example 4

The solid electrolytic capacitor according to the foregoing fourth embodiment was fabricated and its electrical characteristics were measured. The fabrication sequence of the solid electrolytic capacitor was the same as that in Example 3 and the ratio of openings was also 0%. However, when forming a metal layer being the outermost layer of each cathode portion, the metal layer was not caused to extend over an insulator layer. Instead, a layer of a conductive adhesive with a thickness of 10 μm was provided on the surface of the metal layer on each side of an aluminum base and then a copper foil with silver-plated surfaces on both sides was disposed on the surface of each conductive adhesive layer. Four corners of each copper foil provided on the cathode portion crossed over the insulator layer to reach the inside of the respective openings so as to be connected to the copper foil on the opposite side of the capacitor element through the inside of the openings. A conductive adhesive was again applied to the surface of one of the copper foils so as to be bonded to an electrode substrate along with a conductive adhesive provided on an anode portion, and then was heated to 150° C. so as to be cured. The number of solid electrolytic capacitors fabricated and used in the measurement was 30 equal to that in Example 1. Measurement items and a measurement method were also the same as those in Example 1. The average values of the respective characteristics of the 30 solid electrolytic capacitors are shown at Example 4 in Table 1 along with the value of the ratio of the openings.

Example 5

The solid electrolytic capacitor according to the foregoing fifth embodiment was fabricated and its electrical characteristics were measured. The fabrication sequence of the solid electrolytic capacitor was the same as that in Example 1 and the ratio of openings was also 8%. However, it was configured that three solid electrolytic capacitor elements were stacked together in the thickness direction and, in each of the uppermost and middle capacitor elements, an anodized film was also stripped on the lower side of an aluminum base and an anode lead frame was connected thereto by welding. The three capacitor elements were connected together by a conductive adhesive like in the case of connecting an electrode substrate to the upper portion of the uppermost capacitor element, wherein a layer of the conductive adhesive with a thickness of 10 μm was provided at each of connecting portions of anode portions and cathode portions of the respective capacitor elements and then was heated to 150° C. so as to be cured. The number of solid electrolytic capacitors fabricated and used in the measurement was 30 equal to that in Example 1. Measurement items and a measurement method were also the same as those in Example 1. The average values of the respective characteristics of the 30 solid electrolytic capacitors are shown at Example 5 in Table 1 along with the value of the ratio of the openings.

As Comparative Examples, three kinds of solid electrolytic capacitors were fabricated, and their characteristics were compared with those in Examples 1 to 5. Among the three kinds, one was that the sectional area of each circular opening was further increased, another was that an opening was provided only at one position in the center of a cathode portion and no opening was provided at any of four corners, and the other was that no insulator layer was provided on the inner wall surface of each opening and thus a metal layer in each opening was not insulated while the other structure was the same as that in Example 1.

Comparative Example 1

Comparative Example 1 differs from the solid electrolytic capacitor according to the foregoing second embodiment in that the diameter of each of four circular openings was further increased to 1.0 mm. The ratio of the length of a total region occupied by the openings (the ratio of the openings) was increased to 30% with respect to the total length of a region where a cathode portion and an anode portion faced each other with an insulator layer interposed therebetween. The number of solid electrolytic capacitors fabricated and used in the measurement was 30 equal to that in Example 1. Measurement items and a measurement method were also the same as those in Example 1. The average values of the respective characteristics of the 30 solid electrolytic capacitors are shown at Comparative Example 1 in Table 1 along with the value of the ratio of the openings.

Comparative Example 2

Comparative Example 2 differs from the solid electrolytic capacitor according to the foregoing first embodiment in that, instead of the four openings, a circular opening with a diameter of 1.0 mm was formed only at one position in the center of a cathode portion so as to extend in the thickness direction of a capacitor element. Electrical connection between the cathode portions on both sides of the capacitor element was achieved only through the single opening, wherein an insulator layer was first provided on the inner wall surface of the opening and then a metal layer was provided on the surface of the insulator layer when forming a metal layer of the cathode portion. Since there was no opening at any of four corners of the cathode portion, the ratio of a region occupied by the opening was 0%. The number of solid electrolytic capacitors fabricated and used in the measurement was 30 equal to that in Example 1. Measurement items and a measurement method were also the same as those in Example 1. The average values of the respective characteristics of the 30 solid electrolytic capacitors are shown at Comparative Example 2 in Table 1 along with the value of the ratio of the openings.

Comparative Example 3

Comparative Example 3 differs from the solid electrolytic capacitor according to the foregoing first embodiment in that an insulator layer was not provided on the inner wall surface of any of four openings and, therefore, a metal layer in each opening serving to establish electrical connection between metal layers located on both sides of an aluminum base was in direct contact with the inner wall surface of the opening. Since each opening penetrated the aluminum base, a part of the metal layer forming each cathode portion of a capacitor element was brought in direct contact with the aluminum base at this portion. The ratio of the openings was 8% equal to that in Example 1. The number of solid electrolytic capacitors fabricated and used in the measurement was 30 equal to that in Example 1. Measurement items and a measurement method were also the same as those in Example 1. The average values of the respective characteristics of the 30 solid electrolytic capacitors are shown at Comparative Example 3 in Table 1 along with the value of the ratio of the openings.

TABLE 1

| Sample Name | Ratio of Openings (%) | Capacitance (µF) | ESR (mΩ) | ESL (pH) | Leakage Current (µA) |
|---|---|---|---|---|---|
| Example 1 | 8 | 14.0 | 10.0 | 150 | 3 |
| Example 2 | 25 | 11.5 | 11.5 | 155 | 3 |
| Example 3 | 0 | 13.5 | 12.5 | 140 | 2 |
| Example 4 | 0 | 13.8 | 9.3 | 140 | 1 |
| Example 5 | 8 | 40.8 | 5.2 | 145 | 10 |
| Comparative Example 1 | 30 | 9.5 | 13.0 | 200 | 4 |
| Comparative Example 2 | 0 | 7.8 | 22.8 | 145 | 5 |
| Comparative Example 3 | 8 | 13.7 | 10.3 | 150 | 120 |

In Table 1, it is seen that the value of ESL is 155 pH or less in each of Examples 1 to 5 where the ratio of the openings is 25% or less and, therefore, there is obtained the solid electrolytic capacitor with the low ESL value as compared with Comparative Example 1 where the ratio of the openings is 30%. Although depending on the capacitance and the shape and size, the ESL values of currently commercialized general capacitors are about 200 pH in the case of LW reverse type multilayer ceramic capacitors and, therefore, the solid electrolytic capacitor in each of Examples 1 to 5 exhibits the ESL value better than those values.

Although the value of ESR is slightly increased in Example 3 where the ratio of the openings is 0%, it is considered that somewhat narrow portions are formed in the connection regions in the form of the conductive paste between the cathode portions due to the shape in which the cathode lead portions are provided from the cathode portions to the openings, so that the connection resistance is slightly increased. This increase in ESR is solved in Example 4 where the connection between the cathode portions on both sides of the capacitor element is achieved by the copper foil with the silver-plated surfaces on both sides and, therefore, it is seen that the electrical connection using the metal foil in the openings produces the good results. In Example 5, since the three capacitor elements are stacked together, the capacitance and the leakage current are respectively about three times greater than those in Example 1.

In the solid electrolytic capacitor of Comparative Example 1, since the cathode portions are partly removed due to the increase in sectional area of each opening as compared with Examples 1 and 2, the capacitance is decreased and, further, the value of ESL is reduced to the level of the foregoing general multilayer ceramic capacitors. In the case of Comparative Example 2 where the opening is provided only in the middle of the cathode portion, although a reduction in ESL is achieved, the capacitance is reduced due to the reduction in area of the cathode portions and further the value of ESR is increased. This is because deposition of the solid electrolyte layer occurs inside the opening during the fabrication to narrow the opening, so that it becomes difficult to achieve electrical connection between the cathode portions on both sides of the capacitor element. In the case of Comparative Example 3, since no insulator layer is provided on the inner wall surface of each opening, large leakage current is generated between the metal layer, in each opening, connected to the cathode portions and the aluminum base. It is seen that any of Comparative Examples has a problem as a solid electrolytic capacitor.

As described above, according to a solid electrolytic capacitor of this invention, an opening for establishing electrical connection between cathode portions on both sides of a capacitor element is provided at least one of four corners of an insulator layer provided at the peripheries of four sides of the cathode portion or at least one of four corners of an anode portion provided at the peripheries of the insulator layer. In this event, by setting the ratio of a region occupied by this opening to 25% or less in a region where the cathode portion and the anode portion face each other, it is possible to provide a solid electrolytic capacitor using a conductive polymer as an electrolyte, which is large in capacitance and low in ESL. In the foregoing description, the valve action metal is mainly exemplified by aluminum, but it is needless to say that, instead of it, use can be made of tantalum, niobium, titanium, magnesium, or the like. Further, the description of the foregoing Examples is only for explaining the effects in the case of the embodiments of this invention and is not intended to limit the invention described in the claims or narrow the scope of the claims in any aspect. Further, the structures of the respective portions of this invention are not limited to the foregoing embodiments, but can be modified in various ways within the technical scope described in the claims.

What is claimed is:

1. A solid electrolytic capacitor, wherein:
anodized film portions are formed at both surfaces, perpendicular to a thickness direction, of a flat plate-shaped porous valve action metal, and a solid electrolyte layer, a graphite layer, and a metal layer are formed in order on at least a part of a surface of each of the anodized film portions, thereby forming two cathode portions, each of the two cathode portions having a rectangular shape, an insulating portion is formed at a periphery of four sides of at least one of the rectangular cathode portions, and an anode portion comprising a conductive member and electrically connected to the valve action metal is provided so as to face the periphery of the four sides of the at least one of the rectangular cathode portions with the insulating portion interposed therebetween, at least one opening penetrating a part of the valve action metal is provided at a predetermined position including at least one of a part of the insulating portion and a part of the anode portion, the insulating portion and a conductive portion are provided at least a part of an inner wall surface of the opening and the metal layers formed on both sides of the valve action metal are electrically connected to each other by the conductive portion, the anode portion and the cathode portion of the solid electrolytic capacitor element are respectively connected to external anode terminals and external cathode terminals of an electrode substrate in which the external anode terminals and the external cathode terminals are provided in a same plane perpendicular to a thickness direction of the electrode substrate, and the predetermined position where the at least one opening is provided is a position including at least one of a corner of the insulating portion and a corner of the anode portion.

2. A solid electrolytic capacitor according to claim 1, wherein the anode portion comprising the conductive member is formed by an anode lead frame, the anode lead frame is electrically connected to the external anode terminals by a conductive adhesive, and the cathode portion is electrically connected to the external cathode terminals by a conductive adhesive.

3. A solid electrolytic capacitor according to claim 2, wherein at least one of the anodized film portions of the valve action metal is partly removed, and the anode lead frame and the valve action metal are connected to each other by welding in a removal region of the anodized film portion.

4. A solid electrolytic capacitor according to claim 1, wherein the at least one opening is respectively provided at a position including at least a corner of corners of the periphery of the four sides of the rectangular cathode portion and penetrates a part of the anodized film portion, a part of the solid electrolyte layer, a part of the graphite layer, and a part of the metal layer.

5. A solid electrolytic capacitor according to claim 1, wherein a plurality of the openings are provided.

6. A solid electrolytic capacitor according to claim 5, wherein four of the openings are provided.

7. A solid electrolytic capacitor according to claim 1, wherein a sectional shape of the opening is circular.

8. A solid electrolytic capacitor according to claim 1, wherein a sectional shape of the opening is square.

9. A solid electrolytic capacitor according to claim 1, wherein a ratio of a length of a region removed by providing the opening is 25% or less with respect to a total length of the peripheries of the four sides of the cathode portion in a region where the peripheries of the four sides of the cathode portion and the anode portion surrounding the cathode portion with the insulating portion interposed therebetween face each other.

10. A solid electrolytic capacitor according to claim 1, wherein a cathode lead portion extends from at least one corner of the cathode portion to cross the insulating portion and is electrically connected to the conductive portion formed at the inner wall surface of the opening.

11. A solid electrolytic capacitor according to claim 1, wherein the conductive portion comprises a conductive paste provided on a surface of the insulating portion.

12. A solid electrolytic capacitor according to claim 1, wherein the conductive portion is in the form of a metal foil bonded to a surface of the insulating portion by a conductive adhesive.

13. A solid electrolytic capacitor according to claim 1, wherein the external anode terminals and the external cathode terminals are arranged in a checkered pattern in the same plane perpendicular to the thickness direction of the electrode substrate.

14. A solid electrolytic capacitor according to claim 1, wherein a plurality of solid electrolytic capacitor elements are stacked in the thickness direction of the flat plate-shaped valve action metal.

15. A solid electrolytic capacitor according to claim 1, wherein the solid electrolyte layer comprises a conductive polymer.

16. A solid electrolytic capacitor according to claim 1, wherein the flat plate-shaped porous valve action metal comprises aluminum.

17. A solid electrolytic capacitor according to claim 1, wherein the flat plate-shaped porous valve action metal comprises tantalum.

18. A solid electrolytic capacitor, wherein:

anodized film portions are formed at both surfaces, perpendicular to a thickness direction, of a flat plate-shaped porous valve action metal, and a solid electrolyte layer, a graphite layer, and a metal layer are formed in order on at least a part of a surface of each of the anodized film portions, thereby forming two cathode portions, each of the two cathode portions having a rectangular shape, an insulating portion is formed at a periphery of four sides of at least one of the rectangular cathode portions, and an anode portion comprising a conductive member and electrically connected to the valve action metal is provided so as to face the periphery of the four sides of the at least one of the rectangular cathode portions with the insulating portion interposed therebetween, at least one opening penetrating a part of the valve action metal is provided at a predetermined position including at least one of a part of the insulating portion and a part of the anode portion, the insulating portion and a conductive portion are provided at least a part of an inner wall surface of the opening and the metal layers formed on both sides of the valve action metal are electrically connected to each other by the conductive portion, the anode portion and the cathode portion of the solid electrolytic capacitor element are respectively connected to external anode terminals and external cathode terminals of an electrode substrate in which the external anode terminals and the external cathode terminals are provided in a same plane perpendicular to a thickness direction of the electrode substrate, and a ratio of a length of a region removed by providing the opening is 25% or less with respect to a total length of the peripheries of the four sides of the cathode portion in a region where the peripheries of the four sides of the cathode portion and the anode portion surrounding the cathode portion with the insulating portion interposed therebetween face each other.

19. A solid electrolytic capacitor, wherein:

anodized film portions are formed at both surfaces, perpendicular to a thickness direction, of a flat plate-shaped porous valve action metal, and a solid electrolyte layer, a graphite layer, and a metal layer are formed in order on at least a part of a surface of each of the anodized film portions, thereby forming two cathode portions, each of the two cathode portions having a rectangular shape, an insulating portion is formed at a periphery of four sides of at least one of the rectangular cathode portions, and an anode portion comprising a conductive member and electrically connected to the valve action metal is provided so as to face the periphery of the four sides of the at least one of the rectangular cathode portions with the insulating portion interposed therebetween, at least one opening penetrating a part of the valve action metal is provided at a predetermined position including at least one of a part of the insulating portion and a part of the anode portion, the insulating portion and a conductive portion are provided at least a part of an inner wall surface of the opening and the metal layers formed on both sides of the valve action metal are electrically connected to each other by the conductive portion, the anode portion and the cathode portion of the solid electrolytic capacitor element are respectively connected to external anode terminals and external cathode terminals of an electrode substrate in which the external anode terminals and the external cathode terminals are provided in a same plane perpendicular to a thickness direction of the electrode substrate, and a cathode lead portion extends from at least one corner of the cathode portion to cross the insulating portion and is electrically connected to the conductive portion formed at the inner wall surface of the opening.

\* \* \* \* \*